(12) United States Patent
Killian et al.

(10) Patent No.: US 8,006,204 B2
(45) Date of Patent: *Aug. 23, 2011

(54) AUTOMATED PROCESSOR GENERATION SYSTEM FOR DESIGNING A CONFIGURABLE PROCESSOR AND METHOD FOR THE SAME

(75) Inventors: Earl A. Killian, Los Altos Hills, CA (US); Ricardo E. Gonzalez, Menlo Park, CA (US); Ashish B. Dixit, Mountain View, CA (US); Monica Lam, Menlo Park, CA (US); Walter D. Lichtenstein, Belmont, MA (US); Christopher Rowen, Santa Cruz, CA (US); John C. Ruttenberg, Newton, MA (US); Robert P. Wilson, Palo Alto, CA (US); Albert Ren-Rui Wang, Fremont, CA (US); Dror Eliezer Maydan, Palo Alto, CA (US)

(73) Assignee: Tensilica, Inc., Santa Clara, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 11/391,773

(22) Filed: Mar. 27, 2006

(65) Prior Publication Data

US 2006/0259878 A1    Nov. 16, 2006

Related U.S. Application Data

(63) Continuation of application No. 10/884,590, filed on Jul. 2, 2004, now Pat. No. 7,020,854, which is a continuation of application No. 10/286,496, filed on Nov. 1, 2002, now Pat. No. 6,760,888, which is a continuation of application No. 09/246,047, filed on Feb. 5, 1999, now Pat. No. 6,477,683.

(51) Int. Cl.
*G06F 17/50* (2006.01)

(52) U.S. Cl. ........ 716/100; 716/116; 716/117; 716/132; 716/133; 716/139; 700/1; 700/200; 700/220; 717/124; 717/139; 717/140

(58) Field of Classification Search .......... 716/1, 16–17, 716/100, 116, 117, 132, 133, 139; 712/1, 712/200, 220; 717/124, 139, 140
See application file for complete search history.

(56) References Cited

U.S. PATENT DOCUMENTS 5,450,586 A    9/1995   Kuzara et al. .................... 717/4
(Continued)

FOREIGN PATENT DOCUMENTS

EP         0 743 599         11/1996
(Continued)

OTHER PUBLICATIONS

Freericks, "The nML Machine Description Formalism" (Bericht 1991/15 pp. 3-41).
(Continued)

*Primary Examiner* — Thuan Do
*Assistant Examiner* — Nha T Nguyen
(74) *Attorney, Agent, or Firm* — Pillsbury Winthrop Shaw Pittman LLP

(57) ABSTRACT

An automated processor design tool uses a description of customized processor instruction set extensions in a standardized language to develop a configurable definition of a target instruction set, a Hardware Description Language description of circuitry necessary to implement the instruction set, and development tools such as a compiler, assembler, debugger and simulator which can be used to develop applications for the processor and to verify it. Implementation of the processor circuitry can be optimized for various criteria such as area, power consumption, speed and the like. Once a processor configuration is developed, it can be tested and inputs to the system modified to iteratively optimize the processor implementation. By providing a constrained domain of extensions and optimizations, the process can be automated to a high degree, thereby facilitating fast and reliable development.

19 Claims, 14 Drawing Sheets

U.S. PATENT DOCUMENTS

| | | | | |
|---|---|---|---|---|
| 5,535,331 | A | | 7/1996 | Swoboda et al. .............. 714/45 |
| 5,563,987 | A | * | 10/1996 | Scott .......................... 358/1.16 |
| 5,748,875 | A | | 5/1998 | Tzori ............................ 714/29 |
| 5,781,763 | A | * | 7/1998 | Beukema et al. .............. 710/22 |
| 5,819,050 | A | | 10/1998 | Boehling et al. ............. 710/104 |
| 5,854,929 | A | | 12/1998 | Van Praet et al. ................. 717/5 |
| 5,867,399 | A | * | 2/1999 | Rostoker et al. ................ 716/18 |
| 5,867,400 | A | * | 2/1999 | El-Ghoroury et al. ............ 716/1 |
| 5,870,588 | A | | 2/1999 | Rompaey et al. .............. 703/13 |
| 5,896,521 | A | * | 4/1999 | Shackleford et al. ........... 703/21 |
| 5,918,035 | A | | 6/1999 | Van Praet et al. ............ 395/500 |
| 5,964,861 | A | | 10/1999 | Gabzdyl et al. |
| 5,999,734 | A | | 12/1999 | Willis et al. ....................... 717/6 |
| 6,006,022 | A | | 12/1999 | Rhim et al. ....................... 716/1 |
| 6,052,518 | A | | 4/2000 | Shigeta et al. |
| 6,101,592 | A | * | 8/2000 | Pechanek et al. .............. 712/20 |
| 6,115,034 | A | * | 9/2000 | Tanaka et al. ................. 715/700 |
| 6,148,374 | A | * | 11/2000 | Pawlowski .................... 711/128 |
| 6,166,728 | A | * | 12/2000 | Haman et al. ................. 715/719 |
| 6,182,206 | B1 | | 1/2001 | Baxter ............................ 712/43 |
| 6,195,593 | B1 | | 2/2001 | Nguyen .......................... 700/97 |
| 6,477,683 | B1 | | 11/2002 | Killian et al. ..................... 716/1 |
| 6,618,854 | B1 | * | 9/2003 | Mann ............................ 717/124 |
| 6,839,889 | B2 | | 1/2005 | Liu ................................. 716/18 |

FOREIGN PATENT DOCUMENTS

| | | |
|---|---|---|
| JP | 10-187484 | 7/1998 |
| WO | WO 99/00731 | 1/1999 |

OTHER PUBLICATIONS

Fauth et al. Describing instruction set processors using nML (Proc. Euro. Design & Test Conf. Paris Mar. 1995, IEEE 1995, 5 pp.).

Hadjiyiannis et al. "ISDL: an instruction set description language for retargetability" DAC '97, Anaheim California, 1997 ACM 0-89791-920-3/97/06.

Leupers et al. "Retargetable Code Generation Based on Structural Processor Descriptions" (Design Automation for Embedded Systems, vol. 3, No. 1, Jan. 1998, pp. 1-36.

Zivojnovic et al. "DSP Processor/Compiler Co-Design: a quantitative approach" ($9^{th}$ Int'l Symposium on System Synthesis (ISSS '96), Nov. 6-8, 1996, San Diego, CA.

Fauth et al., "Generation of hardware machine models from instruction set descriptions,"VLSI Signal Processing VI, 1993, Workshop on Veldhoven, Netherlands, 20-22, Oct. 1993, New York NY, USA, IEEE Oct. 20, 1993 pp. 242-250.

Hartoog et al. "Generation of Software Tools from Processor Descriptions for Hardware/Software Codesign" (ACM, Jun. 1997, pp. 303-306.

Internet Publication http://www.retarget.com/brfchschk.html (19 pp. undated).

Internet Publication http://www.synopsys.com/products/designware/8051_ds.html (8pp. undated).

Internet Publication http://www.synopsys.com/oruducts/designware/dwpci_ds.html (16 pp. undated).

Internet Publication http://www.lexra.com/product.html (11 pp. undated).

Internet Publication http://www.risccores.com/html/body_aboutarc.htm (13 pp. undated).

Tensilica "Xtensa" Instruction Set Architecture (ISA) Ref. Manual. Rev. 1.0, Tensilica, Inc.

Fauth, A., et al., "Describing Instruction Set Processors Using nML," IEEE, p. 503-507, (1995).

Hartoog, Mark R., et al., "Generation of Software Tools from Processor Descriptions for Hardware/Software Co-design," 34th Design Automation Conference (DAC), p. 1-4, (1997).

Akaboshi, et al., "Study on Design Support for Computer Architecture", *Design Automation*, 68-7, 13 pages (Oct. 28, 1993).

Fauth, et al., "Describing Instruction Set Processors Using nML", *Proc. EP Design and Test Conf.*, Parish, Mar. 1995, 5 pages.

Hadjiyiannis, G., et al., "ISDL: An Instruction Set Description Language for Retargetability", Jun. 9, 1997, 4 pages.

Hakata, et al., "A Software Development Took Generator for ASIC CPU", *Design Automation*, 62-25, May 18, 1992, pp. 144-147.

Hikichi, et al.,, "Compilers for Embedded System", *Tech. Report of IEICE*, Apr. 1998, 13 pages.

Ohtsuki, et al., "HW/SW Co-Design System PEAS-II for VLIW Processor", *DA Symposium*, Jul. 1998, 7 pages.

Sato, et al., "Implementation and Evaluation of PEAS: Practical Environment for ASIP Development", *Design Automation*, 64-11, Oct. 23, 1992, pp. 79-86.

Shiomi, et al., "Proposal of Co-Design Workbench PEAS-III for ASIP Design", *Design Automation*, 76-10, Jul. 20, 1995, pp. 73-80.

Clucas, R., "Designing with a Customisable Microprocessor Core", Electronic Engineering, vol. 71, No. 865, Feb. 1, 1999, p. 35.

Nurprasetyo, et al., "Soft-Core Processor Architecture for Embedded System Design", IEICE Trans. on Electronics, Electronics Soc., vol. E81-C, No. 9, Sep. 1, 1998, pp. 1416-1423.

Sato, et al., "PEAS-1: A hardware/Software Codesign System for ASIP Development", IEICE Trans. on Fundamentals of Electronics, Communications and Computer Sciences, Engineering Sciences Soc., vol. E77-A, No. 3, Mar. 1, 1994, pp. 483-491.

Shackleford, et al., "Satsuki: An Integrated Processor Synthesis and Compiler Generation System", IEICE Trans. on Information and Systems, Information and Society; vol. E79-D, No. 10, Oct. 1, 1996, pp. 1373-1381.

Yang, et al., "MetaCore: An Application specific DSP Development System", Design Automation Conf., 1998, Proc. San Francisco, CA , Jun. 15-19, 1998, IEEE, Jun. 15, 1998, pp. 800-803.

* cited by examiner

AUTOMATED PROCESSOR GENERATION SYSTEM FOR DESIGNING A CONFIGURABLE PROCESSOR AND METHOD FOR THE SAME

PRIOR APPLICATIONS

This is a continuation of application Ser. No. 10/884,590 filed Jul. 2, 2004, (issuing as U.S. Pat. No. 7,020,854 on Mar. 28, 2006), which is a continuation of application Ser. No. 10/286,496 filed Nov. 1, 2002, now U.S. Pat. No. 6,760,888 issued Jul. 6, 2004, which is a continuation of U.S. application Ser. No. 09/246,047 filed Feb. 5, 1999, now U.S. Pat. No. 6,477,683 issued Nov. 5, 2002.

BACKGROUND OF THE INVENTION

1. Field of the Invention

The present invention is directed to systems and techniques for designing programmable processing elements such as microprocessors and the like. More particularly, the invention is directed to the design of an application solution containing one or more processors to where the processors in the system are configured and enhanced at the time of their design to improve their suitability to a particular application.

2. Description of Related Art

Processors have traditionally been difficult to design and to modify. For this reason, most systems that contain processors use ones that were designed and verified once for general-purpose use, and then used by multiple applications over time. As such, their suitability for a particular application is not always ideal. It would often be appropriate to modify the processor to execute a particular application's code better (e.g., to run faster, consume less power, or cost less). However, the difficulty, and therefore the time, cost, and risk of even modifying an existing processor design is high, and this is not typically done.

To better understand the difficulty in making a prior art processor configurable, consider its development. First, the instruction set architecture (ISA) is developed. This is a step which is essentially done once and used for decades by many systems. For example, the Intel Pentium® processor can trace the legacy of its instruction set back to the 8008 and 8080 microprocessors introduced in the mid-1970's. In this process, based on predetermined ISA design criteria, the ISA instructions, syntax, etc. are developed, and software development tools for that ISA such as assemblers, debuggers, compilers and the like are developed. Then, a simulator for that particular ISA is developed and various benchmarks are run to evaluate the effectiveness of the ISA and the ISA is revised according to the results of the evaluation. At some point, the ISA will be considered satisfactory, and the ISA process will end with a fully developed ISA specification, an ISA simulator, an ISA verification suite and a development suite including, e.g., an assembler, debugger, compiler, etc.

Then, processor design commences. Since processors can have useful lives of a number of years, this process is also done fairly infrequently—typically, a processor will be designed once and used for many years by several systems. Given the ISA, its verification suite and simulator and various processor development goals, the microarchitecture of the processor is designed, simulated and revised. Once the microarchitecture is finalized, it is implemented in a hardware description language (HDL) and a microarchitecture verification suite is developed and used to verify the HDL implementation (more on this later). Then, in contrast to the manual processes described to this point, automated design tools may synthesize a circuit based on the HDL description and place and route its components. The layout may then be revised to optimize chip area usage and timing. Alternatively, additional manual processes may be used to create a floorplan based on the HDL description, convert the HDL to circuitry and then both manually and automatically verify and lay the circuits out. Finally, the layout is verified to be sure it matches the circuits using an automated tool and the circuits are verified according to layout parameters.

After processor development is complete, the overall system is designed. Unlike design of the ISA and processor, system design (which may include the design of chips that now include the processor) is quite common and systems are typically continuously designed. Each system is used for a relatively short period of time (one or two years) by a particular application. Based on predetermined system goals such as cost, performance, power and functionality; specifications of pre-existing processors; specifications of chip foundries (usually closely tied with the processor vendors), the overall system architecture is designed, a processor is chosen to match the design goals, and the chip foundry is chosen (this is closely tied to the processor selection).

Then, given the chosen processor, ISA and foundry and the simulation, verification and development tools previously developed (as well as a standard cell library for the chosen foundry), an HDL implementation of the system is designed, a verification suite is developed for the system HDL implementation and the implementation is verified. Next, the system circuitry is synthesized, placed and routed on circuit boards, and the layout and timing are re optimized. Finally, the boards are designed and laid out, the chips are fabricated and the boards are assembled.

Another difficulty with prior art processor design stems from the fact that it is not appropriate to simply design traditional processors with more features to cover all applications, because any given application only requires a particular set of features, and a processor with features not required by the application is overly costly, consumes more power and is more difficult to fabricate. In addition it is not possible to know all of the application targets when a processor is initially designed. If the processor modification process could be automated and made reliable, then the ability of a system designer to create application solutions would be significantly enhanced.

As an example, consider a device designed to transmit and receive data over a channel using a complex protocol. Because the protocol is complex, the processing cannot be reasonably accomplished entirely in hard-wired, e.g., combinatorial, logic, and instead a programmable processor is introduced into the system for protocol processing. Programmability also allows bug fixes and later upgrades to protocols to be done by loading the instruction memories with new software. However, the traditional processor was probably not designed for this particular application (the application may not have even existed when the processor was designed), and there may be operations that it needs to perform that require many instructions to accomplish which could be done with one or a few instructions with additional processor logic.

Because the processor cannot easily be enhanced, many system designers do not attempt to do so, and instead choose to execute an inefficient pure software solution on an available general-purpose processor. The inefficiency results in a solution that may be slower, or require more power, or be costlier (e.g., it may require a larger, more powerful processor to execute the program at sufficient speed). Other designers choose to provide some of the processing requirements in special-purpose hardware that they design for the application, such as a coprocessor, and then have the programmer code up access to the special-purpose hardware at various points in the program. However, the time to transfer data between the processor and such special-purpose hardware limits the utility of this approach to system optimization because only fairly large units of work can be sped up enough so that the time saved by using the special-purpose hardware is greater than the additional time required to transfer data to and from the specialized hardware.

In the communication channel application example, the protocol might require encryption, error correction, or compression/decompression processing. Such processing often operates on individual bits rather than a processor's larger words. The circuitry for a computation may be rather modest, but the need for the processor to extract each bit, sequentially process it and then repack the bits adds considerable overhead.

As a very specific example, consider a Huffman decode using the rules shown in TABLE I (a similar encoding is used in the MPEG compression standard). Both the value and the

TABLE I

| Pattern | | | | | | | | Value | Length |
|---|---|---|---|---|---|---|---|---|---|
| 0 | 0 | X | X | X | X | X | X | 0 | 2 |
| 0 | 1 | X | X | X | X | X | X | 1 | 2 |
| 1 | 0 | X | X | X | X | X | X | 2 | 2 |
| 1 | 1 | 0 | X | X | X | X | X | 3 | 3 |
| 1 | 1 | 1 | 0 | X | X | X | X | 4 | 4 |
| 1 | 1 | 1 | 1 | 0 | X | X | X | 5 | 5 |
| 1 | 1 | 1 | 1 | 1 | 0 | X | X | 6 | 6 |
| 1 | 1 | 1 | 1 | 1 | 1 | 0 | X | 7 | 7 |
| 1 | 1 | 1 | 1 | 1 | 1 | 1 | 0 | 8 | 8 |
| 1 | 1 | 1 | 1 | 1 | 1 | 1 | 1 | 9 | 8 | length must be computed, so that length bits can be shifted off to find the start of the next element to be decoded in the stream.

There are a multitude of ways to code this for a conventional instruction set, but all of them require many instructions because there are many tests to be done, and in contrast with a single gate delay for combinatorial logic, each software implementation requires multiple processor cycles. For example, an efficient prior art implementation using the MIPS instruction set might require six logical operations, six conditional branches, an arithmetic operation, and associated register loads. Using an advantageously-designed instruction set such as the one disclosed in U.S. patent application Ser. No. 09/192,395 to Dixit et al., incorporated herein by reference, the coding is better, but still expensive in terms of time: one logical operation, six conditional branches, an arithmetic operation and associated register loads.

In terms of processor resources, this is so expensive that a 256-entry lookup table is typically used instead of coding the process as a sequence of bit-by-bit comparisons. However, a 256-entry lookup table takes up significant space and can be many cycles to access as well. For longer Huffman encodings, the table size would become prohibitive, leading to more complex and slower code.

A possible solution to the problem of accommodating specific application requirements in processors is to use configurable processors having instruction sets and architectures which can be easily modified and extended to enhance the functionality of the processor and customize that functionality. Configurability allows the designer to specify whether or how much additional functionality is required for her product. The simplest sort of configurability is a binary choice: either a feature is present or absent. For example, a processor might be offered either with or without floating-point hardware.

Flexibility may be improved by configuration choices with finer gradation. The processor might, for example, allow the system designer to specify the number of registers in the register file, memory width, the cache size, cache associativity, etc. However, these options still do not reach the level of customizability desired by system designers. For example, in the above Huffman decoding example, although not known in the prior art the system designer might like to include a specific instruction to perform the decode, e.g.

huff8 t1, t0 where the most significant eight bits in the result are the decoded value and the least significant eight bits are the length. In contrast to the previously described software implementation, a direct hardware implementation of the Huffman decode is quite simple—the logic to decode the instruction represents roughly thirty gates for just the combinatorial logic function exclusive of instruction decode, etc., or less than 0.1% of a typical processor's gate count, and can be computed by a special-purpose processor instruction in a single cycle, thus representing an improvement factor of 4-20 over using general-purpose instructions only.

Prior art efforts at configurable processor generation have generally fallen into two categories: logic synthesis used with parameterized hardware descriptions; and automatic retargeting of compilers and assemblers from abstract machine descriptions. In the first category fall synthesizable processor hardware designs such as the Synopsys DW8051 processor, the ARM/Synopsys ARM7-S, the Lexra LX-4080, the ARC configurable RISC core; and to some degree the Synopsys synthesizable/configurable PCI bus interface.

Of the above, the Synopsys DW8051 includes a binary compatible implementation of an existing processor architecture; and a small number of synthesis parameters, e.g., 128 or 256 bytes of internal RAM, a ROM address range determined by a parameter rom_addr_size, an optional interval timer, a variable number (0-2) of serial ports, and an interrupt unit which supports either six or thirteen sources. Although the DW8051 architecture can be varied somewhat, no changes in its instruction set architecture are possible.

The ARM/Synopsys ARM7-S processor includes a binary-compatible implementation of existing architecture and microarchitecture. It has two configurable parameters: the selection of a high-performance or low-performance multiplier, and inclusion of debug and in-circuit emulation logic. Although changes in the instruction set architecture of the ARM7-S are possible, they are subsets of existing non-configurable processor implementations, so no new software is required.

The Lexra LX-4080 processor has a configurable variant of the standard MIPS architecture and has no software support for instruction set extensions. Its options include a custom engine interface which allows extension of MIPS ALU opcodes with application-specific operations; an internal hardware interface which includes a register source and a register or 16-bit wide immediate source, and destination and stall signals; a simple memory management unit option; three Mips coprocessor interfaces; a flexible local memory interface to cache, scratchpad RAM or ROM; a bus controller to connect peripheral functions and memories to the processor's own local bus; and a write buffer of configurable depth.

The ARC configurable RISC core has a user interface with on-the-fly-gate count estimation based on target technology and clock speed, instruction cache configuration, instruction set extensions, a timer option, a scratch-pad memory option, and memory controller options; an instruction set with selectable options such as local scratchpad RAM with block move to memory, special registers, up to sixteen extra condition code choices, a 32×32 bit scoreboarded multiply block, a single cycle 32 bit barrel shifter/rotate block, a normalize (find first bit) instruction, writing results directly to a command buffer (not to the register file), a 16 bit MULIMAC block and 36 bit accumulator, and sliding pointer access to local SRAM using linear arithmetic; and user instructions defined by manual editing of VHDL source code. The ARC design has no facility for implementing an instruction set description language, nor does it generate software tools specific to the configured processor.

The Synopsys configurable PCI interface includes a GUI or command line interface to installation, configuration and synthesis activities; checking that prerequisite user actions are taken at each step; installation of selected design files based on configuration (e.g., Verilog vs. VHDL); selective configuration such as parameter setting and prompting of users for configuration values with checking of combination validity, and HDL generation with user updating of HDL source code and no editing of HDL source files; and synthesis functions such as a user interface which analyzes a technology library to select I/O pads, technology-independent constraints and synthesis script, pad insertion and prompts for technology-specific pads, and translation of technology-independent formulae into technology-dependent scripts. The configurable PCI bus interface is notable because it implements consistency checking of parameters, configuration-based installation, and automatic modification of HDL files.

Additionally, prior art synthesis techniques do choose different mappings based on user goal specifications, allowing the mapping to optimize for speed, power, area, or target components. On this point, in the prior art it is not possible to get feedback on the effect of reconfiguring the processor in these ways without taking the design through the entire mapping process. Such feedback could be used to direct further reconfiguration of the processor until the system design goals are achieved.

The second category of prior art work in the area of configurable processor generation, i.e., automatic retargetting of compilers and assemblers) encompasses a rich area of academic research; see, e.g., Hanono et al., "Instruction Selection, Resource Allocation and Scheduling in the AVIV Retargetable Code Generator" (representation of machine instructions used for automatic creation of code generators); Fauth et al., "Describing Instruction Set Processors Using nML"; Ramsey et al., "Machine Descriptions to Build Tools for Embedded Systems"; Aho et al, "Code Generation Using Tree Matching and Dynamic Programming" (algorithms to match up transformations associated with each machine instruction, e.g., add, load, store, branch, etc., with a sequence of program operations represented by some machine independent intermediate form using methods such as pattern matching); and Cattell, "Formalization and Automatic Derivation of Code Generators" (abstract descriptions of machine architectures used for compiler research).

Once the processor has been designed, its operation must be verified. That is, processors generally execute instructions from a stored program using a pipeline with each stage suited to one phase of the instruction execution. Therefore, changing or adding an instruction or changing the configuration may require widespread changes in the processor's logic so each of the multiple pipeline stages can perform the appropriate action on each such instruction. Configuration of a processor requires that it be re-verified, and that this verification adapt to the changes and additions. This is not a simple task. Processors are complex logic devices with extensive internal data and control state, and the combinatorics of control and data and program make processor verification a demanding art. Adding to the difficulty of processor verification is the difficulty in developing appropriate verification tools. Since verification is not automated in prior art techniques, its flexibility, speed and reliability is less than optimal.

In addition, once the processor is designed and verified it is not particularly useful if it cannot be programmed easily. Processors are generally programmed with the aid of extensive software tools, including compilers, assemblers, linkers, debuggers, simulators and profilers. When the processor changes, the software tools must change as well. It does no good to add an instruction if that instruction cannot be compiled, assembled, simulated or debugged. The cost of software changes associated with processor modifications and enhancements has been a major impediment to flexible processor design in the prior art.

Thus, it is seen that prior art processor design is of a level of difficulty that processors generally are not typically designed or modified for a specific application. Also, it can be seen that considerable improvements in system efficiency are possible if processors could be configured or extended for specific applications. Further, the efficiency and effectiveness of the design process could be enhanced if it were able to use feedback on implementation characteristics such as power consumption, speed, etc. in refining a processor design. Moreover, in the prior art once a processor is modified, a great deal of effort is required to verify the correct operation of the processor after modification. Finally, although prior art techniques provide for limited processor configurability, they fail to provide for the generation of software development tools tailored for use with the configured processor.

BRIEF SUMMARY OF THE INVENTION

The present invention overcomes these problems of the prior art and has an object of providing a system which can automatically configure a processor by generating both a description of a hardware implementation of the processor and a set of software development tools for programming the processor from the same configuration specification.

It is another object of the present invention to provide such a system which can optimize the hardware implementation and the software tools for various performance criteria.

It is still another object of the present invention to provide such a system that permits various types of configurability for the processor, including extensibility, binary selection and parametric modification.

It is yet another object of the present invention to provide such a system which can describe the instruction set architecture of the processor in a language which can easily be implemented in hardware.

The above objects are achieved by providing an automated processor generation system which uses a description of customized processor instruction set options and extensions in a standardized language to develop a configured definition of a target instruction set, a Hardware Description Language description of circuitry necessary to implement the instruction set, and development tools such as a compiler, assembler, debugger and simulator which can be used to generate software for the processor and to verify the processor. Implementation of the processor circuitry can be optimized for various criteria such as area, power consumption and speed. Once a processor configuration is developed, it can be tested and inputs to the system modified to iteratively optimize the processor implementation.

To develop an automated processor generation system according to the present invention, an instruction set architecture description language is defined and configurable processor/system configuration tools and development tools such as assemblers, linkers, compilers and debuggers are developed. This is part of the development process because although large portions of the tools are standard, they must be made to be automatically configured from the ISA description. This part of the design process is typically done by the designer or manufacturer of the automated processor design tool itself.

An automated processor generation system according to the present invention operates as follows. A user, e.g., a system designer, develops a configured instruction set architecture. That is, using the ISA definition and tools previously developed, a configurable instruction set architecture following certain ISA design goals is developed. Then, the development tools and simulator are configured for this instruction set architecture. Using the configured simulator, benchmarks are run to evaluate the effectiveness of the configurable instruction set architecture, and the core revised based on the evaluation results. Once the configurable instruction set architecture is in a satisfactory state, a verification suite is developed for it.

Along with these software aspects of the process, the system attends to hardware aspects by developing a configurable processor. Then, using system goals such as cost, performance, power and functionality and information on available processor fabs, the system designs an overall system architecture which takes configurable ISA options, extensions and processor feature selection into account. Using the overall system architecture, development software, simulator, configurable instruction set architecture and processor HDL implementation, the processor ISA, HDL implementation, software and simulator are configured by the system and system HDL is designed for system on a chip designs. Also, based on the system architecture and specifications of chip foundries, a chip foundry is chosen based on an evaluation of foundry capabilities with respect to the system HDL (not related to processor selection as in the prior art). Finally, using the foundry's standard cell library, the configuration system synthesizes circuitry, places and routes it, and provides the ability to re-optimize the layout and timing. Then, circuit board layouts are designed if the design is not of the single-chip type, chips are fabricated, and the boards are assembled.

As can be seen above, several techniques are used to facilitate extensive automation of the processor design process. The first technique used to address these issues is to design and implement specific mechanisms that are not as flexible as an arbitrary modification or extension, but which nonetheless allow significant functionality improvements. By constraining the arbitrariness of the change, the problems associated with it are constrained.

The second technique is to provide a single description of the changes and is automatically generate the modifications or extensions to all affected components. Processors designed with prior art techniques have not done this because it is often cheaper to do something once manually than to write a tool to do it automatically and use the tool once. The advantage of automation applies when the task is repeated many times.

A third technique employed is to build a database to assist in estimation and automatic configuration for subsequent user evaluation.

Finally, a fourth technique is to provide hardware and software in a form that lends itself to configuration. In the preferred embodiment of the present invention some of the hardware and software are not written directly in standard hardware and software languages, but in languages enhanced by the addition of a preprocessor that allows queries of the configuration database and the generation of standard hardware and software language code with substitutions, conditionals, replication, and other modifications. The core processor design is then done with hooks that allow the enhancements to be linked in.

To illustrate these techniques, consider the addition of application-specific instructions. By constraining the method to instructions that have register and constant operands and which produce a register result, the operation of the instructions can be specified with only combinatorial (stateless, feedback free) logic. This input specifies the opcode assignments, instruction name, assembler syntax and the combinatorial logic for the instructions, from which tools generate:

instruction decode logic for the processor to recognize the new opcodes;

addition of a functional unit to perform the combinatorial logic function on register operands;

inputs to the instruction scheduling logic of the processor to make sure the instruction issues only when its operands are valid;

assembler modifications to accept the new opcode and its operands and generate the correct machine code;

compiler modifications to add new intrinsic functions to access the new instructions;

disassembler/debugger modifications to interpret the machine code as the new instruction;

simulator modifications to accept the new opcodes and to perform the specified logic function; and diagnostic generators which generate both direct and random code sequences that contain and check the results of the added instructions.

All of the techniques above are employed to add application specific instructions. The input is constrained to input and output operands and the logic to evaluate them. The changes are described in one place and all hardware and software modifications are derived from that description. This facility shows how a single input can be used to enhance multiple components.

The result of this process is a system that is much better at meeting its application needs than existing art because tradeoffs between the processor and the rest of the system logic can be made much later in the design process. It is superior to many of the prior art approaches discussed above in that its configuration may be applied to many more forms of representation. A single source may be used for all ISA encoding, software tools and high-level simulation may be included in a configurable package, and flow may be designed for iteration to find an optimal combination of configuration values. Further, while previous methods focused only on hardware configuration or software configuration alone without a single user interface for control, or a measurement system for user-directed redefinition, the present invention contributes to complete flow for configuration of processor hardware and software, including feedback from hardware design results and software performance to aid selection of optimal configuration.

BRIEF DESCRIPTION OF THE DRAWINGS

The above and other objects of the present invention will become readily apparent when reading the following detailed description taken in conjunction with the appended drawings in which.

DETAILED DESCRIPTION OF PRESENTLY PREFERRED EMBODIMENTS

Generally, the automated processor generation process begins with a configurable processor definition and user-specified modifications thereto, as well as a user-specified application to which the processor is to be configured. This information is used to generate a configured processor taking the user modifications into account and to generate software development tools, e.g., compiler, simulator, assembler and disassembler, etc., for it. Also, the application is recompiled using the new software development tools. The recompiled application is simulated using the simulator to generate a software profile describing the configured processor's performance running the application, and the configured processor is evaluated with respect to silicon chip area usage, power consumption, speed, etc. to generate a hardware profile characterizing the processor circuit implementation. The software and hardware profile are fed back and provided to the user to enable further iterative configuration so that the processor can be optimized for that particular application.

Figure 1:
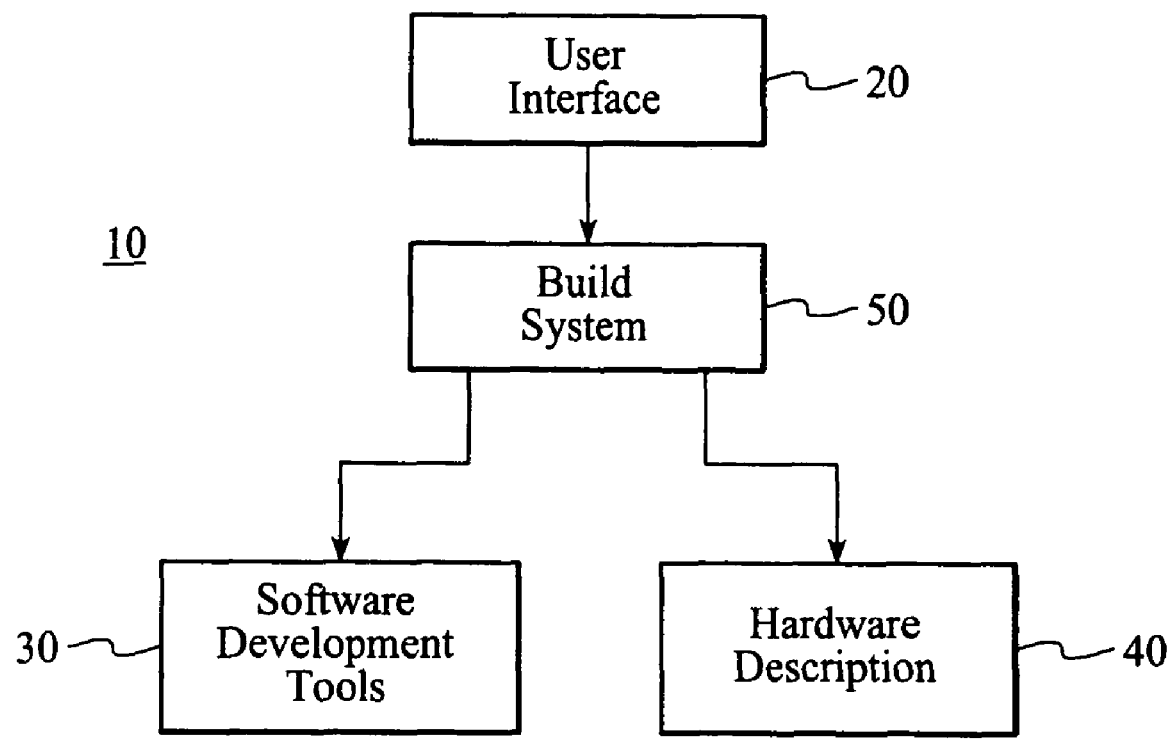
FIG. 1 is a block diagram of the major components of an automated processor generation system according to a preferred embodiment of the present invention.

An automated processor generation system 10 according to a preferred embodiment of the present invention has four major components as shown in FIG. 1: a user configuration interface 20 through which a user wishing to design a processor enters her configurability and extensibility options and other design constraints; a suite of software development tools 30 which can be customized for a processor designed to the criteria chosen by the user; a parameterized, extensible description of a hardware implementation of the processor 40; and a build system 50 receiving input data from the user interface, generating a customized, synthesizable hardware description of the requested processor, and modifying the software development tools to accommodate the chosen design. Preferably, the build system 50 additionally generates diagnostic tools to verify the hardware and software designs and an estimator to estimate hardware and software characteristics.

"Hardware implementation description", as used herein and in the appended claims, means one or more descriptions which describe aspects of the physical implementation of a processor design and, alone or in conjunction with one or more other descriptions, facilitate production of chips according to that design. Thus, components of the hardware implementation description may be at varying levels of abstraction, from relatively high levels such as hardware description languages through netlists and microcoding to mask descriptions. In the preferred embodiment, however, the primary components of the hardware implementation description are written in an HDL, netlists and scripts.

Further, HDL as used herein and in the appended claims is intended to refer to the general class of hardware description languages which are used to describe microarchitectures and the like, and it is not intended to refer to any particular example of such languages.

Figure 2:
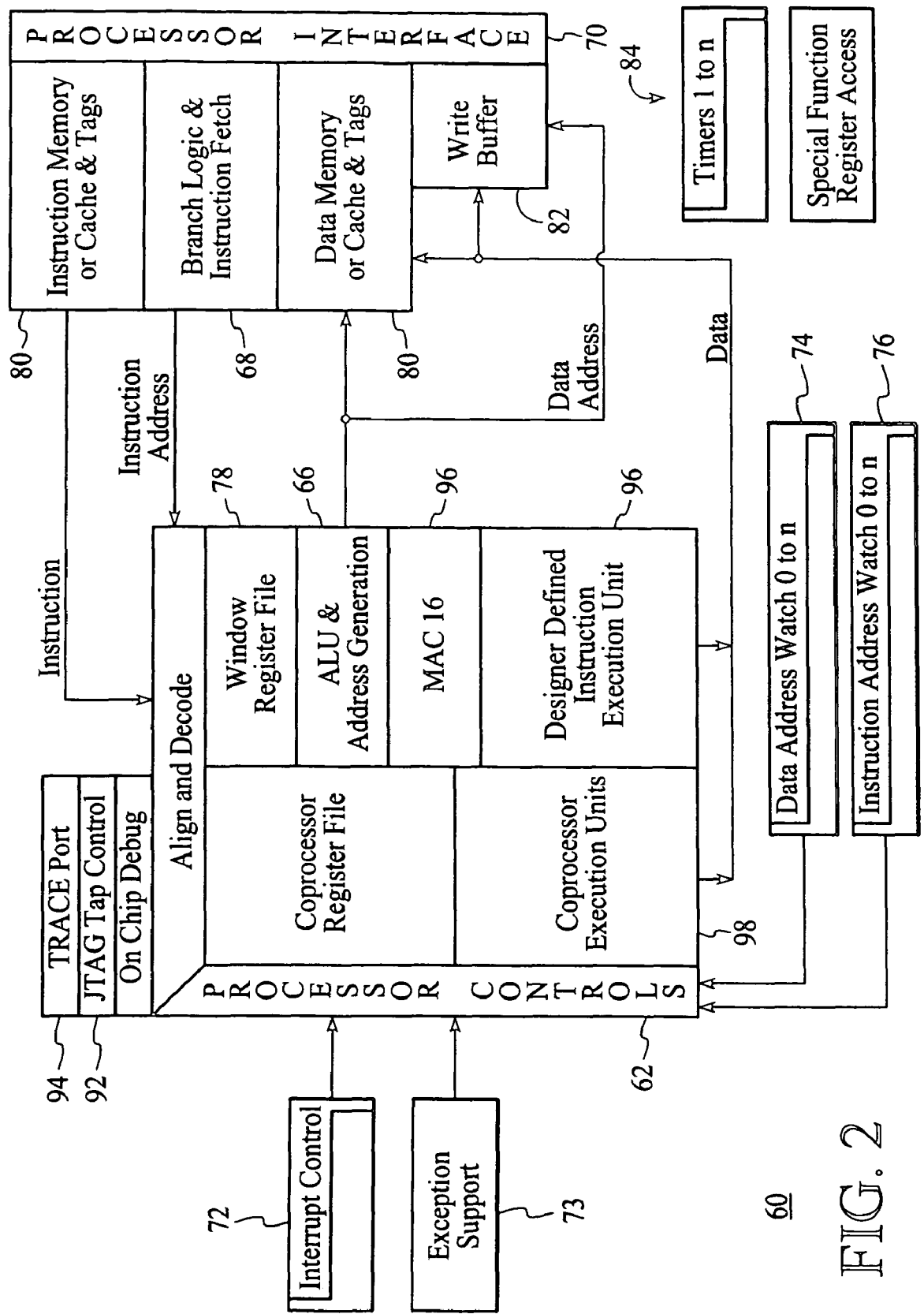
FIG. 2 is a block diagram of the architecture of a configurable processor according to the preferred embodiment.

In the preferred embodiment, the basis for processor configuration is the architecture 60 shown in FIG. 2. A number of elements of the architecture are basic features which cannot be directly modified by the user. These include the processor controls section 62, the align and decode section 64 (although parts of this section are based on the user-specified configuration), the ALU and address generation section 66, the branch logic and instruction fetch, 68 and the processor interface 70. Other units are part of the basic processor but are user configurable. These include the interrupt control section 72, the data and instruction address watch sections 74 and 76, the window register file 78, the data and instruction cache and tags sections 80, the write buffers 82 and the timers 84. The remaining sections shown in FIG. 2 are optionally included by the user.

A central component of the processor configuration system 10 is the user configuration interface 20. This is a module which preferably presents the user with a graphical user interface (GUI) by which it is possible to select processor functionality including reconfiguration of compiler and regeneration of assembler, disassembler and instruction set simulator (ISS); and preparation of input for launching of full processor synthesis, placement and routing. It also allows the user to take advantage of the quick estimation of processor area, power consumption, cycle time, application performance and code size for further iteration and enhancement of the processor configuration. Preferably, the GUI also accesses a configuration database to get default values and do error checking on user input.

To use the automated processor generation system 10 according to the preferred embodiment to design a processor 60, a user inputs design parameters into the user configuration interface 20. The automated processor generation system 10 may be a stand-alone system running on a computer system under the control of the user; however, it preferably runs primarily on a system under the control of the manufacturer of the automated processor generation system 10. User access may then be provided over a communication network. For example, the GUI may be provided using a web browser with data input screens written in HTML and Java. This has several advantages, such as maintaining confidentiality of any proprietary back-end software, simplifying maintenance and updating of the back end software, and the like. In this case, to access the GUI the user may first log on to the system 10 to prove his identity.

Figure 3:
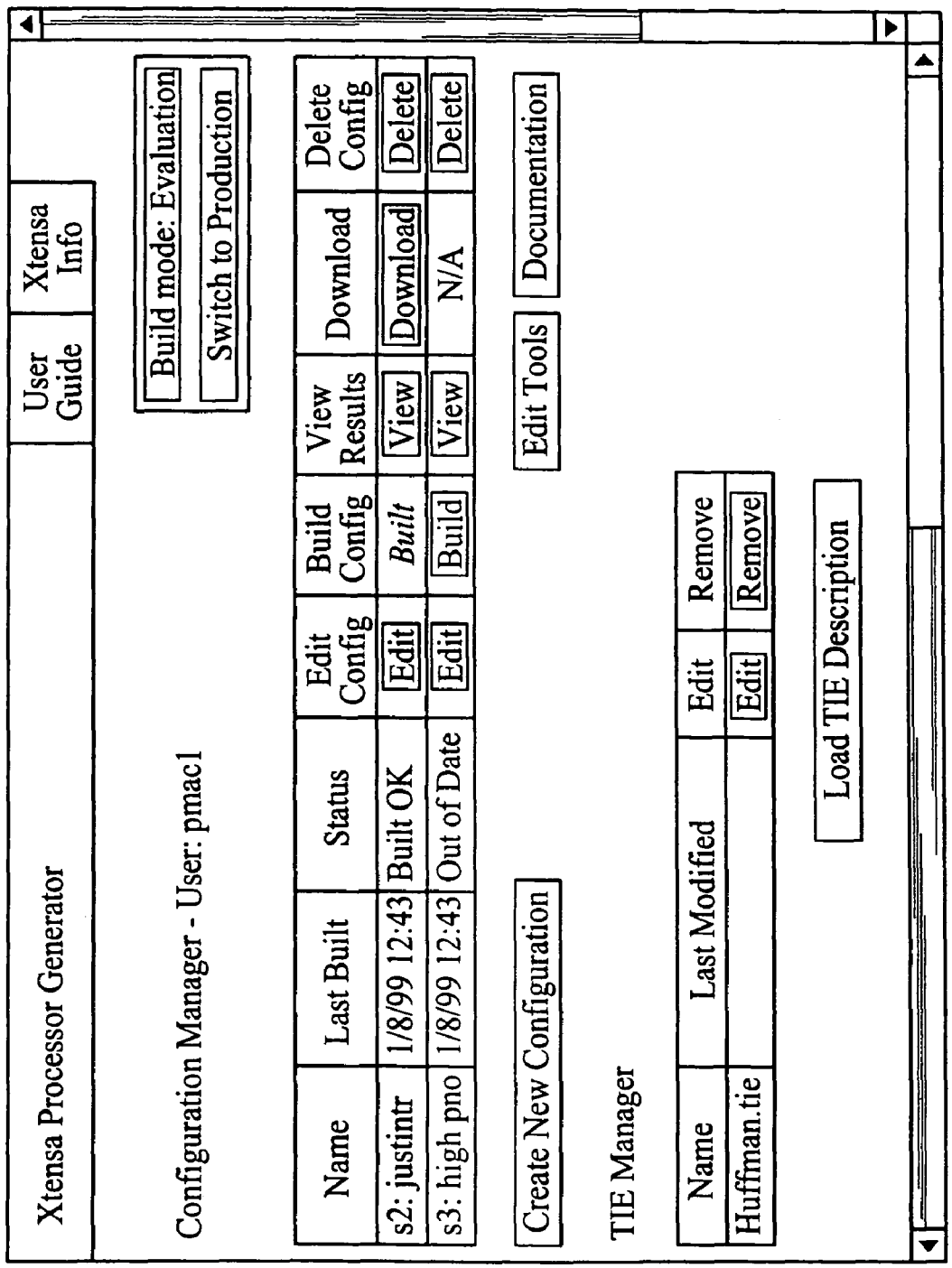
FIG. 3 shows a configuration manager in a GUI according to the preferred embodiment.

Once the user has access, the system displays a configuration manager screen 86 as shown in FIG. 3. The configuration manager 86 is a directory listing all of the configurations accessible by the user. The configuration manager 86 in FIG. 3 shows that the user has two configurations, "just intr" and "high prio", the first having already been built, i.e., finalized for production, and the second yet to be built. From this screen 86 the user may build a selected configuration, delete it, edit it, generate a report specifying which configuration and extension options have been chosen for that configuration, or create a new configuration. For those configurations which have been built, such as "just intr", a suite of software development tools 30 customized for it can be downloaded.

Figure 4:
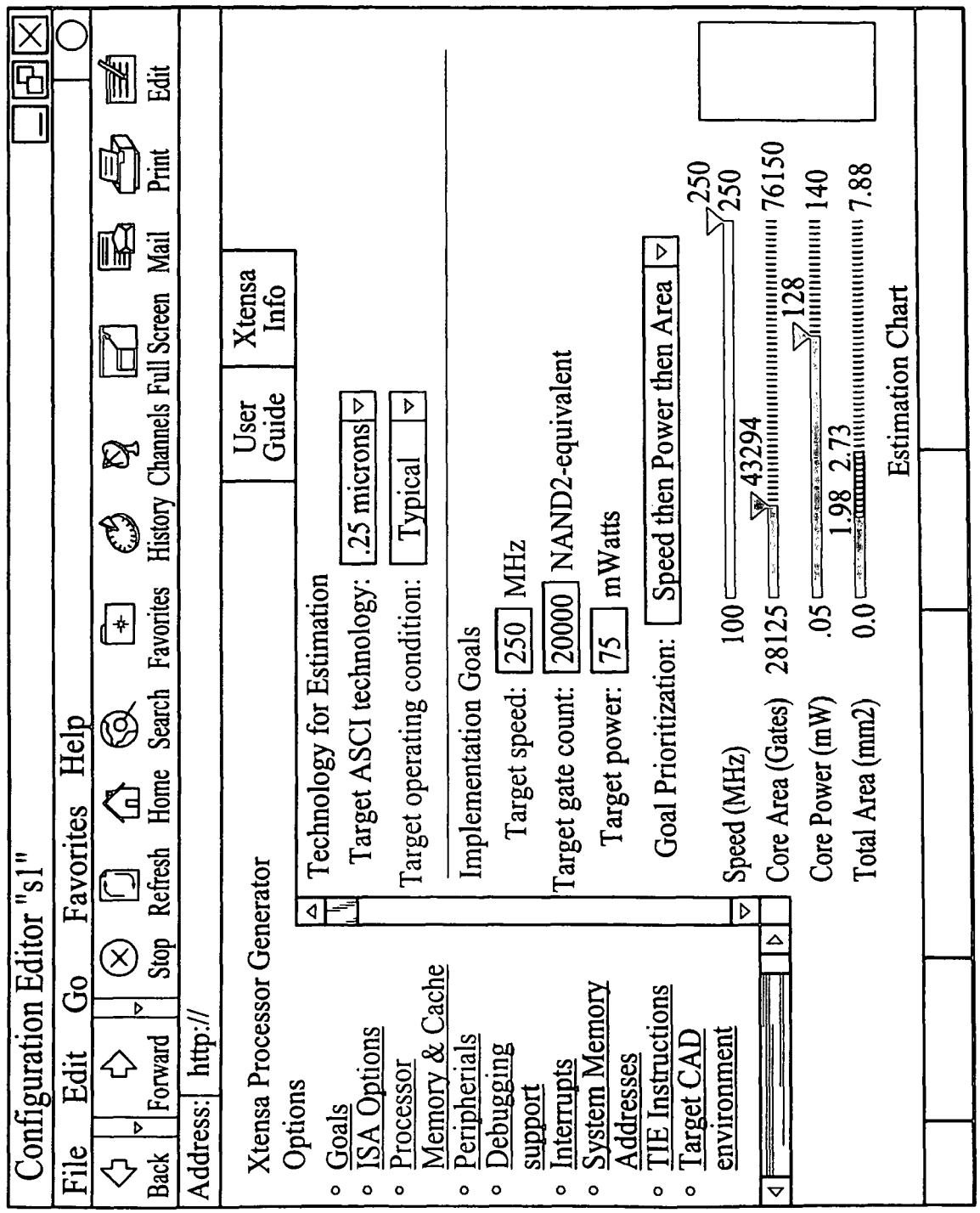
FIG. 4 shows a configuration editor in the GUI according to the preferred embodiment.

Creating a new configuration or editing an existing one brings up the configuration editor 88 shown in FIG. 4. The configuration editor 88 has an "Options" section menu on the left showing the various general aspects of the processor 60 which can be configured and extended. When an option section is selected, a screen with the configuration options for that section appears on the right, and these options can be set with pull down menus, memo boxes, check boxes, radio buttons and the like as is known in the art. Although the user can select options and enter data at random, preferably data is entered into each sequentially, since there are logical dependencies between the sections; for example, to properly display options in the "Interrupts" section, the number of interrupts must have been chosen in the "ISA Options" section.

In the preferred embodiment, the following configuration options are available for each section:

Goals
    Technology for Estimation
    Target ASIC technology: 0.18, 0.25, 0.35 micron
    Target operating condition: typical, worst-case
    Implementation Goals
    Target speed: arbitrary
    Gate count: arbitrary
    Target power: arbitrary
    Goal prioritization: speed, area power; speed, power, area
ISA Options
    Numeric Options
    MAC 16 with 40-bit accumulator: yes, no
    16-bit multiplier: yes, no
    Exception Options
    Number of interrupts: 0-32
    High priority interrupt levels: 0-14
    Enable Debugging: yes, no
    Number of Timers: 0-3
    Other
    Byte Ordering: little endian, big endian
    Number of registers available for call windows: 32, 64
Processor Cache & Memory
    Processor interface read width (bits): 32, 64, 128
    Write-buffer entries (address/value pairs): 4, 8, 16, 32
    Processor Cache
    Instruction/Data cache size (kB): 1, 2, 4, 8, 16
    Instruction/Data cache line size (kB): 16, 32, 64
Peripheral Components
    Timers
    Timer interrupt numbers
    Timer interrupt levels
Debugging Support
    Number of instruction address breakpoint registers: 0-2
    Number of data address breakpoint registers: 0-2
    Debug interrupt level
    Trace port: yes, no
    On-chip debug module: yes, no
    Full scan: yes. no
Interrupts
    Source: external, software
    Priority level
System Memory Addresses
    Vector and address calculation method: XTOS, manual
    Configuration Parameters
    RAM size, start address: arbitrary
    ROM size, start address: arbitrary
    XTOS: arbitrary
    Configuration Specific Addresses
    User exception vector: arbitrary
    Kernel Exception vector: arbitrary
    Register window over/underflow vector base: arbitrary
    Reset vector: arbitrary
    XTOS start address: arbitrary
    Application start address: arbitrary
TIE Instructions
    (define ISA extensions)
Target CAD Environment
    Simulation
    Verilog™: yes, no
    Synthesis
    Design Compiler™: yes, no
    Place & Route
    Apollo™: yes, no Additionally, the system 10 may provide options for adding other functional units such as a 32-bit integer multiply/divide unit or a floating point arithmetic unit; a memory management unit; on-chip RAM and ROM options; cache associativity; enhanced DSP and coprocessor instruction set; a write-back cache; multiprocessor synchronization; compiler-directed speculation; and support for additional CAD packages. Whatever configuration options are available for a given configurable processor, they are preferably listed in a definition file (such as the one shown in Appendix A) which the system 10 uses for syntax checking and the like once the user has selected appropriate options.

Figure 5:
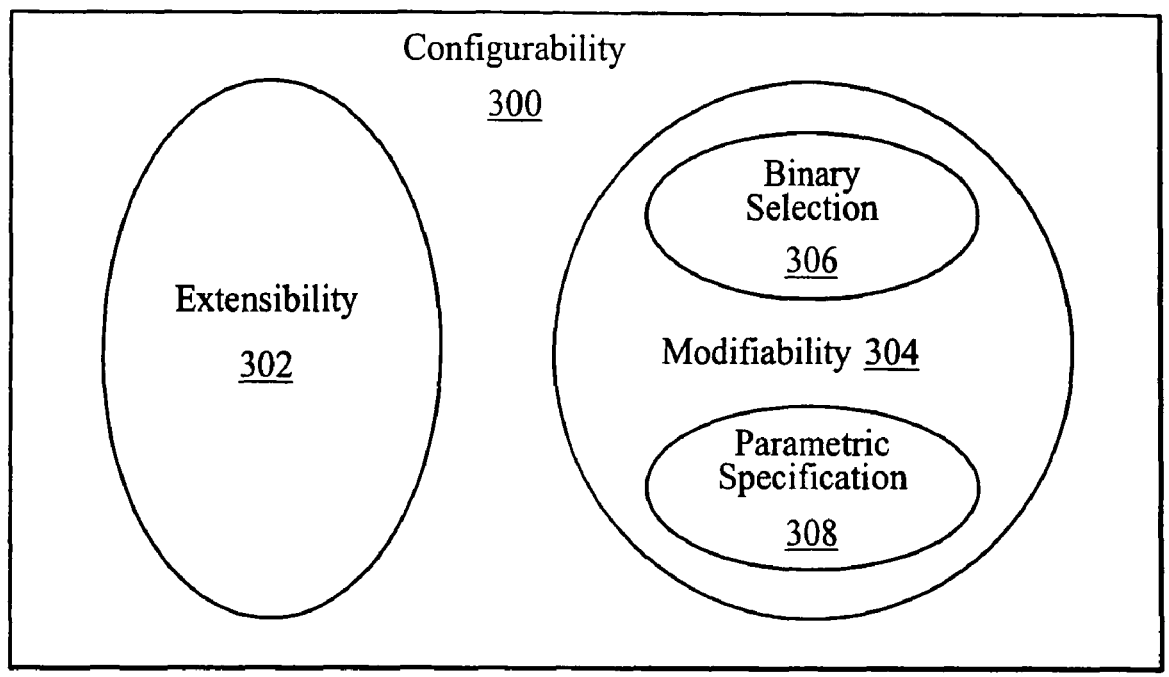
FIG. 5 shows different types of configurability according to the preferred embodiment.

From the above, one can see that the automated processor configuration system 10 provides two broad types of configurability 300 to the user as shown in FIG. 5: extensibility 302, which permits the user to define arbitrary functions and structures from scratch, and modifiability 304, which permits the user to select from a predetermined, constrained set of options. Within modifiability the system permits binary selection 306 of certain features; e.g., whether a MAC 16 or a DSP should be added to the processor 60) and parametric specification 308 of other processor features, e.g., number of interrupts and cache size.

Many of the above configuration options will be familiar to those in the art; however, others merit particular attention. For example, the RAM and ROM options allow the designer to include scratch pad or firmware on the processor 10 itself. The processor 10 can fetch instructions or read and write data from these memories. The size and placement of the memories is configurable. In the preferred embodiment, each of these memories is accessed as an additional set in a set-associative cache. A hit in the memory can be detected by comparison with a single tag entry.

The system 10 provides separate configuration options for the interrupt (implementing level 1 interrupts) and the high-priority interrupt option (implementing level 2-15 interrupts and non maskable interrupts) because each high-priority interrupt level requires three special registers, and these are thus more expensive.

The MAC 16 with 40-bit accumulator option (shown at 90 in FIG. 2) adds a 16-bit multiplier/add function with a 40-bit accumulator, eight 16-bit operand registers and a set of compound instructions that combine multiply, accumulate, operand load and address update instructions. The operand registers can be loaded with pairs of 16-bit values from memory in parallel with multiply/accumulate operations. This unit can sustain algorithms with two loads and a multiply/accumulate per cycle.

The on-chip debug module (shown at 92 in FIG. 2) is used to access the internal, software-visible state of the processor 60 through the JTAG port 94. The module 92 provides support for exception generation to put the processor 60 in the debug mode; access to all program-visible registers or memory locations; execution of any instruction that the processor 60 is configured to execute; modification of the PC to jump to a desired location in the code; and a utility to allow return to a normal operation mode, triggered from outside the processor 60 via the JTAG port 94.

Once the processor 10 enters debug mode, it waits for an indication from the outside world that a valid instruction has been scanned in via the JTAG port 94. The processor then executes this instruction and waits for the next valid instruction. Once the hardware implementation of the processor 10 has been manufactured, this module 92 can be used to debug the system. Execution of the processor 10 can be controlled via a debugger running on a remote host. The debugger interfaces with the processor via the JTAG port 94 and uses the capability of the on-chip debug module 92 to determine and control the state of the processor 10 as well as to control execution of the instructions.

Up to three 32-bit counter/timers 84 may be configured. This entails the use of a 32-bit register which increments each clock cycle, as well as (for each configured timer) a compare register and a comparator which compares the compare register contents with the current clocked to register count, for use with interrupts and similar features. The counter/timers can be configured as edge-triggered and can generate normal or high-priority internal interrupts.

The speculation option provides greater compiler scheduling flexibility by allowing loads to be speculatively moved to control flows where they would not always be executed. Because loads may cause exceptions, such load movement could introduce exceptions into a valid program that would not have occurred in the original. Speculative loads prevent these exceptions from occurring when the load is executed, but provide an exception when the data is required. Instead of causing an exception for a load error, speculative loads reset the valid bit of the destination register (new processor state associated with this option).

Although the core processor 60 preferably has some basic pipeline synchronization capability, when multiple processors are used in a system, some sort of communication and synchronization between processors is required. In some cases self-synchronizing communication techniques such as input and output queues are used. In other cases, a shared memory model is used for communication and it is necessary to provide instruction set support for synchronization because shared memory does not provide the required semantics. For example, additional load and store instructions with acquire and release semantics can be added. These are useful for controlling the ordering of memory references in multiprocessor systems where different memory locations may be used for synchronization and data so that precise ordering between synchronization references must be maintained. Other instructions may be used to create semaphore systems known in the art.

In some cases, a shared memory model is used for communication, and it is necessary to provide instruction set support for synchronization because shared memory does not provide the required semantics. This is done by the multiprocessor synchronization option.

Perhaps most significantly among the configuration options are the TIE instruction definitions from which the designer-defined instruction execution unit 96 is built. The TIE™ (Tensilica Instruction Set Extensions) language developed by Tensilica Corporation of Santa Clara, Calif. allows the user to describe custom functions for his applications in the form of extensions and new instructions to augment the base ISA. Additionally, due to TIE's flexibility it may be used to describe portions of the ISA which cannot be changed by the user; in this way, the entire ISA can is be used to generate the software development tools 30 and hardware implementation description 40 uniformly. A TIE description uses a number of building blocks to delineate the attributes of new instructions as follows:

| instruction fields | instruction classes |
| instruction opcodes | instruction semantics |
| instruction operands | constant tables |

Instruction field statements field are used to improve the readability of the TIE code. Fields are subsets or concatenations of other fields that are grouped together and referenced by a name. The complete set of bits in an instruction is the highest level superset field inst, and this field can be divided into smaller fields. For example,

| field x | inst[11:8] |
| field y | inst[15:12] |
| field xy | {x, y} | defines two 4-bit fields, x and y, as sub-fields (bits 8-11 and 12-15, respectively) of a highest-level field inst and an 8-bit field xy as the concatenation of the x and y fields.

The statements opcode define opcodes for encoding specific fields. Instruction fields that are intended to specify operands, e.g., registers or immediate constants, to be used by the thusdefined opcodes, must first be defined with field statements and then defined with operand statements.

For example,

| opcode | acs | op2 = 4'b0000 | CUST0 |
| opcode | adsel | Op2 = 4'b0001 | CUST0 | defines two new opcodes, acs and adsel, based on the previously-defined opcode CUST0 (4' b0000 denotes a four bit-long binary constant 0000). The TIE specification of the preferred core ISA has the statements

| field op0 | Inst[3:0] |
| field op1 | Inst[19:16] |
| field opt | Inst[23:20] |
| opcode | QRST op0 = 4'b0000 |
| opcode | CUST0 op1=4'b0100 QRST | as part of its base definitions. Thus, the definitions of acs and adsel cause the TIE compiler to generate instruction decoding logic respectively represented by the following:

```
inst[23:0] = 0000 0110 xxxx xxxx xxxx 0000
inst[23:0] = 0001 0110 xxxx xxxx xxxx 0000
```

Instruction operand statements operand identify registers and immediate constants. Before defining a field as an operand, however, it must have been previously been defined as a field as above. If the operand is an immediate constant, the value of the constant can be generated from the operand, or it can be taken from a previously defined constant table defined as described below. For example, to encode an immediate operand the TIE code

```
field        offset    inst[23:6]
operand      offests4 offset {
    assign   offsets4 = {{14{offset[17]}}, offset} <<2;
}{
    wire     [31:0] t;
    assign   t = offsets4>>2;
    assign   offset = t[17:0];
``` defines an 18-bit field named offset which holds a signed number and an operand of fsets4 which is four times the number stored in the offset field. The last part of the operand statement actually describes the circuitry used to perform the computations in a subset of the Verilog™ HDL for describing combinatorial circuits, as will be apparent to those skilled in the art.

Here, the wire statement defines a set of logical wires named t thirty-two bits wide. The first assign statement after the wire statement specifies that the logical signals driving the logical wires are the of fsets4 constant shifted to the right, and the second assign statement specifies that the lower eighteen bits of t are put into the offset field. The very first assign statement directly specifies the value of the of fsets4 operand as a concatenation of offset and fourteen replications of its sign bit (bit 17) followed by a shift left of two bits.

For a constant table operand, the TIE code

```
table prime 16 {
    2, 3, 5, 7, 9, 11, 13, 17, 19, 23, 29, 31, 37, 41, 43, 47, 53
}
operand      prime_s    s {
    assign   prime_s = prime[s];
} {
    assign s = prime_s == prime[0]   ?   4'b0000
               prime_s == prime[1]   ?   4'b0001
               prime_s == prime[2]   ?   4'b0010
               prime_s == prime[3]   ?   4'b0011
               prime_s == prime[4]   ?   4'b0100
               prime_s == prime[5]   ?   4'b0101
               prime_s == prime[6]   ?   4'b0110
               prime_s == prime[7]   ?   4'b0111
               prime_s == prime[8]   ?   4'b1000
               prime_s == prime[9]   ?   4'b1001
               prime_s == prime[10]  ?   4'b1010
               prime_s == prime[11]  ?   4'b1011
               prime_s == prime[12]  ?   4'b1100
               prime_s == prime[13]  ?   4'b1101
               prime_s == prime[14]  ?   4'b1110
                                         4'b1111;
}
``` makes use of the table statement to define an array prime of constants (the number following the table name being the number of elements in the table) and uses the operand s as an index into the table prime to encode a value for the operand prime_s (note the use of Verilog™ statements in defining the indexing).

The instruction class statement iclass associates opcodes with operands in a common format. All instructions defined in an iclass statement have the same format and operand usage. Before defining an instruction class, its components must be defined, first as fields and then as opcodes and operands. For example, building on the code used in the preceding example defining opcodes acs and adsel, the additional statements

```
operand    art    t    {assign art = AR[t];} { }
operand    ars    s    {assign ars = AR{s};} { }
operand    arr    r    {assign AR[r] = arr;} { }
``` use the operand statement to define three register operands art, ars and arr (again note the use of Verilog™ statements in the definition). Then, the iclass statement

```
iclass    viterbi    {adsel, acs} {out arr, in art, in ars}
``` specifies that the operands adsel and acs belong to a common class of instructions viterbi which take two register operands art and ars as input and writes output to a register operand arr.

The instruction semantic statement semantic describes the behavior of one or more instructions using the same subset of Verilog™ used for coding operands. By defining multiple instructions in a single semantic statement, some common expressions can be shared and the hardware implementation can be made more efficient. The variables allowed in semantic statements are operands for opcodes defined in the statement's opcode list, and a single bit variable for each opcode specified in the opcode list. This variable has the same name as the opcode and evaluates to 1 when the opcode is detected. It is used in the computation section (the Verilog™ subset section) to indicate the presence of the corresponding instruction.

For example, TIE code defining a new instruction ADD8_4 which performs additions of four 8-bit operands in a 32-bit word with respective 8-bit operands in another 32-bit word and a new instruction MIN 16_2 which performs minimum selections between two 16-bit operands in a 32-bit word and respective 16-bit operands in another 32-bit word might read:

```
opcode ADD8_4       op2=4'b0000 CUST0
opcode MIN16_2      op2=4'b0001 CUST0
iclass add_min      {ADD8 4, MIN16_2} {out arr, in ars, in art}
semantic add_min    {ADD8 4, MIN16_2} {
    wire [31:0] add, min;
    wire [7:0] add3, add2, add1, add0;
    wire [15:0] min1, min0;
    assign add3 = art[31:24] + ars[31:24];
    assign add2 = art[23:16] + ars[23:16];
    assign add1 = art[15:8] + ars[15:8];
    assign add0 = art[7:0] + ars[7:0];
    assign add = {add3, add2, add1, add0};
    assign min1 = art[31:16] < ars[31:16] ? art[31:16]: ars[31:16]:
    assign min0 = art[15:0] < ars[15:0] ? art[15:0] : ars[15:0];
    assign min = {min1, min0}:
    assign arr = (({32{{ADD8_4}}}) & (add)) I
                 (({32{{MIN16_2}}}) & (min));
}
```

Here, op2, CUST0, arr, art and ars are predefined operands as noted above, and the opcode and iclass statements function as described above.

The semantic statement specifies the computations performed by the new instructions. As will be readily apparent to those skilled in the art, the second line within the semantic statement specifies the computations performed by the new ADD8_4 instruction, the third and fourth lines therein specify the computations performed by the new MIN16_2 instruction, and the last line within the section specifies the result written to the arr register.

Returning to the discussion of the user input interface 20, once the user has entered all of the configuration and extension options she desires, the build system 50 takes over. As shown in FIG. 5, the build system 50 receives a configuration specification constituted by the parameters set by the user and extensible features designed by the user, and combines them with additional parameters defining the core processor architecture, e.g., features not modifiable by the user, to create a single configuration specification 100 describing the entire processor. For example, in addition to the configuration settings 102 chosen by the user, the build system 50 might add parameters specifying the number of physical address bits for the processor's physical address space, the location of the first instruction to be executed by the processor 60 after reset, and the like.

The Xtensa™ Instruction Set Architecture (ISA) Reference Manual, Revision 1.0 by Tensilica, Inc. is incorporated herein by reference for the purposes of illustrating examples of instructions that can be implemented within the configurable processor as core instructions and instructions which are available via the selection of configuration options.

The configuration specification 100 also includes an ISA package containing TIE language statements specifying the base ISA, any additional packages which might have been selected by the user such as a coprocessor package 98 (see FIG. 2) or a DSP package, and any TIE extensions supplied by the user. Additionally, the configuration specification 100 may have a number of statements setting flags indicative of whether certain structural features are to be included in the processor 60. For example,

| | |
|---|---|
| IsaUseDebug | 1 |
| IsaUseInterrupt | 1 |
| IsaUseHighPriorityInterrupt | 0 |
| IsaUseException | 1 | indicates that the processor will include the on chip debugging module 92; interrupt facilities 72 and exception handling, but not high priority interrupt facilities.

Using the configuration specification 100, the following can be automatically generated as will be shown below:
- instruction decode logic of the processor 60;
- illegal instruction detection logic for the processor 60;
- the ISA-specific portion of the assembler 110;
- the ISA-specific support routines for the compiler 108;
- the ISA-specific portion of the disassembler 100 (used by the debugger); and
- the ISA-specific portion of the simulator 112.

It is valuable to generate these things automatically because an important configuration capability is to specify the inclusion of packages of instructions. For some things, it would be possible to implement this with conditionalized code in each of the tools to handle the instruction if it has been configured, but this is awkward; more importantly, it does not allow the system designer to easily add instructions for his system.

In addition to taking a configuration specification 100 as an input from the designer, it is also possible to accept goals and have the build system 50 determine the configuration automatically. The designer can specify goals for the processor 60. For example, clock rate, area, cost, typical power consumption, and maximum power consumption might be goals. Since some of the goals conflict (e.g., often performance can be increased only by increasing area or power consumption or both), the build system 50 also takes a priority ordering for the goals. The build system 50 then consults a search engine 106 to determine the set of configuration options available and determines how to set each option from an algorithm that attempts to simultaneously achieve the input goals.

The search engine 106 includes a database that has entries that describe the effect on the various metrics. Entries can specify that a particular configuration setting has an additive, multiplicative, or limiting effect on a metric. Entries can also be marked as requiring other configuration options as prerequisites, or as being incompatible with other options. For example, the simple branch prediction option can specify a multiplicative or additive effect on Cycles Per Instruction (CPI—a determinant of performance), a limit on clock rate, an additive effect on area, and an additive effect on power. It can be marked as incompatible with a fancier branch predictor, and dependent on setting the instruction fetch queue size to at least two entries. The value of these effects may be a function of a parameter, such as branch prediction table size. In general, the database entries are represented by functions that can be evaluated.

Various algorithms are possible for finding configuration settings that come closest to achieving the input goals. For example, a simple knapsack packing algorithm considers each option in sorted order of value divided by cost and accepts any option specification that increases value while keeping cost below a specified limit. So, for example, to maximize performance while keeping power below a specified value, the options would be sorted by performance divided by power and each option that increases performance that can be configured without exceeding the power limit is accepted. More sophisticated knapsack algorithms provide some amount of backtracking.

A very different sort of algorithm for determining the configuration from goals and the design database is based on simulated annealing. A random initial set of parameters is used as the starting point, and then changes of individual parameters are accepted or rejected by evaluating a global utility function. Improvements in the utility function are always accepted while negative changes are accepted probabilistically based on a threshold that declines as the optimization proceeds. In this system the utility function is constructed from the input goals. For example, given the goals Performance>200, Power<100, Area<4, with the priority of Power, Area, and Performance, the following utility function could be used:

$$\text{Max}((1-\text{Power}/100)*0.5, 0)+(\max((1-\text{Area}/4)*0.3, 0)*(\text{if Power}<100 \text{ then } 1 \text{ else } (1-\text{Power}/100)**2))+(\max(\text{Performance}/200*0.2, 0)*(\text{if Power}<100 \text{ then } 1 \text{ else } (1-\text{Power}/100)**2))*(\text{if Area}<4 \text{ then } 1 \text{ else } (1-\text{area}/4)**2))$$

which rewards decreases in power consumption until it is below 100 and then is neutral, rewards decreases in area until it is below 4, and then is neutral, and rewards increases in performance until it is above 200, and then is neutral. There are also components that reduce the area usage when power is out of spec and that reduce the performance usage when power or area are out of spec.

Both these algorithms and others can be used to search for configurations that satisfy the specified goals. What is important is that the configurable processor design has been described in a design database that has prerequisite and incompatibility option specifications and the impact of the configuration options on various metrics.

The examples we have given have used hardware goals that are general and not dependent on the particular algorithm being run on the processor 60. The algorithms described can also be used to select configurations well suited for specific user programs. For example, the user program can be run with a cache accurate simulator to measure the number of cache misses for different types of caches with different characteristics such as different sizes, different line sizes and different set associativities. The results of these simulations can be added to the database used by the search algorithms 106 described to help select the hardware implementation description 40.

Similarly, the user algorithm can be profiled for the presence of certain instructions that can be optionally implemented in hardware. For example, if the user algorithm spends a significant time doing multiplications, the search engine 106 might automatically suggest including a hardware multiplier. Such algorithms need not be limited to considering one user algorithm. The user can feed a set of algorithms into the system, and the search engine 106 can select a configuration that is useful on average to the set of user programs.

In addition to selecting preconfigured characteristics of the processors 60, the search algorithms can also be used to automatically select or suggest to the users possible TIE extensions. Given the input goals and given examples of user programs written perhaps in the C programming to language, these algorithms would suggest potential TIE extensions. For TIE extensions without state, compiler like tools can be embodied with pattern matchers. These pattern matchers walk expression nodes in a bottom up fashion searching for multiple instruction patterns that could be replaced with a single instruction. For example, say that the user C program contains the following statements.

$$x=(y+z)<<2;$$

$$x2=(y2+z2)<<2;$$

The pattern matcher would discover that the user in two different locations adds two numbers and shifts the result two bits to the left. The system would add to a database the possibility of generating a TIE instruction that adds two numbers and shifts the result two bits to the left.

The build system 50 keeps track of many possible TIE instructions along with a count of how many times they appear. Using a profiling tool, the system 50 also keeps track of how often each instruction is executed during the total execution of the algorithm. Using a hardware estimator, the system 50 keeps track of how expensive in hardware it would be to implement each potential TIE instruction. These numbers are fed into the search heuristic algorithm to select a set of potential TIE instructions that maximize the input goals; goals such as performance, code size, hardware complexity and the like.

Similar but more powerful algorithms are used to discover potential TIE instructions with state. Several different algorithms are used to detect different types of opportunities. One algorithm uses a compiler like tool to scan the user program and detect if the user program requires more registers than are available on the hardware. As known to practitioners in the art, this can be detected by counting the number of register spills and restores in the compiled version of the user code.

The compiler like tool suggests to the search engine a coprocessor with additional hardware registers 98 but supporting only the operations used in the portions of the user's code that has many to spills and restores. The tool is responsible for informing the database used by the search engine 106 of an estimate of the hardware cost of the coprocessor as well as an estimate of how the user's algorithm performance is improved. The search engine 106, as described before, makes a global decision of whether or not the suggested coprocessor 98 leads to a better configuration.

Alternatively or in conjunction therewith, a compiler-like tool checks if the user program uses bit mask operations to insure that certain variables are never larger than certain limits. In this situation, the tool suggests to the search engine 106 a co-processor 98 using data types conforming to the user limits (for example, 12 bit or 20 bit or any other size integers). In a third algorithm used in another embodiment, used for user programs in C++, a compiler like tool discovers that much time is spent operating on user defined abstract data types. If all the operations on the data type are suitable for TIE, the algorithm proposes to the search engine 106 implementing all the operations on the data type with a TIE coprocessor.

To generate the instruction decode logic of the processor 60, one signal is generated for each opcode defined in the configuration specification. The code is generated by simply rewriting the opcode NAME FIELD = VALUE declaration to the HDL statement assign NAME = FIELD == VALUE;

and the opcode NAME FIELD = VALUE PARENTNAME [FIELD2 = VALUE2] to
assign NAME = PARENTNAME & (FIELD == VALUE)

The generation of register interlock and pipeline stall signals has also been automated. This logic is also generated based on the information in the configuration specification. Based on register usage information contained in the iclass statement and the latency of the instruction the generated logic inserts a stall (or bubble) when the source operand of the current instruction depends on the destination operand of a previous instruction which has not completed. The mechanism for implementing this stall functionality is implemented as part of the core hardware.

The illegal instruction detection logic is generated by NOR'ing together the individual generated instruction signals AND'ed with their field restrictions:

assign illegalinst = !(INST1 | INST2... | INSTn);

The instruction decode signals and the illegal instruction signal are available as outputs of the decode module and as inputs to the hand written processor logic.

To generate other processor features, the preferred embodiment uses a Verilog™ description of the configurable processor 60 enhanced with a Perl based preprocessor language. Perl is a full-featured language including complex control structures, subroutines, and I/O facilities. The preprocessor, which in a preferred embodiment of the present invention is called TPP (as shown in the source listing in Appendix B, TPP is itself a Perl program), scans its input, identifies certain lines as preprocessor code (those prefixed by a semicolon for TPP) written in the preprocessor language (Pert for TPP), and constructs a program consisting of the extracted lines and statements to generate the text of the other lines. The non preprocessor lines may have embedded expressions in whose place expressions generated as a result of the TPP processings are substituted. The resultant program is then executed to produce the source code, i.e., Verilog™ code for describing the detailed processor logic 40 (as will be seen below, TPP is also used to configure the software development to tools 30).

When used in this context, TPP is a powerful preprocessing language because it permits the inclusion of constructs such as configuration specification queries, conditional expressions and iterative structures in the Verilog™ code, as well as implementing embedded expressions dependent on the configuration specification 100 in the Verilog™ code as noted above.

For example, a TPP assignment based on a database query might look like

```
; $endian = config_get_value ("IsaMemoryOrder")
``` where config_get_value is the TPP function used to query the configuration specification 100, IsaMemoryOrder is a flag set in the configuration specification 100, and $endian is a TPP variable to be used later in generating the Verilog™ code.

A TPP conditional expression might be

```
; if (config_get_value("IsaMemoryOrder") eq "LittleEndian")
;     {do Verilog ™ code for little endian ordering}
; else
;     {do Verilog ™ code for big endian ordering}
```

Iterative loops can be implemented by TPP constructs such as

```
; for {$i=0; $i<$ninterrupts; $i++}
;     {do Verilog ™ code for each of 1..N interrupts}
``` where $i is a TPP loop index variable and $ninterrupts is the number of interrupts specified for the processor 60 (obtained from the configuration specification 100 using config_get_value).

Finally, TPP code can be embedded into Verilog™ expressions such as

```
wire ['$ninterrupts-1':0] srInterruptEn;
xtscenflop #('$ninterrupts') srintrenreg (srInterruptEn,
srDataIn_W['$ninterrupts-1':0], srIntrEnWEn, !cReset,CLK);
``` where:

$ninterrupts defines the number of interrupts and determines the width (in terms of bits) of the xtscenfiop module (a flip flop primitive module);

srInterruptEn is the output of the flip flop, defined to be a wire of appropriate number of bits;

srDataIn_w is the input to the flip flop, but only relevant bits are input based on number of interrupts;

srIntrEnWEn is the write enable of the flip flop;

cReset is the clear input to the flip flop; and

CLK is the input clock to the flip flop.

For example, given the following input to TPP:

```
; # Timer Interrupt
; if ($IsaUseTimer) {
wire ['$width-1':0] srCCount;
wire ccountWEn;
//-----------------------------------------------------------
// CCOUNT Register
//-----------------------------------------------------------
assign ccountWEn = srWEn_W && (srWrAdr_W =_ 'SRCCOUNT);
xtflop #('$width') srcntreg (srCCount, (ccountWEn ? srDataIn_W
srCCount+1),CLK);
; for ($i=0; $i<$TimerNumber; $i++) {
//-----------------------------------------------------------
// CCOMPARE Register
//-----------------------------------------------------------
wire ['$width 1':0] srCCompare'$i';
wire ccompWEn'$i';
assign ccompWEn'$i' = srWEn_W &&
(srWrAdr_W == 'SRCCOMPARE'$i');
xtenflop #('$width') srccmp'$i'reg
(srCCompare'$i',srDataIn_W,ccompWEn'$i',CLK);
assign setCCompIntr'$i' = (srCCompare'$i' == srCCount);
assign clrCCompIntr'$i' = ccompWEn'$i';
; }
; } ## IsaUseTimer
``` and the declarations

```
$IsaUseTimer = 1
$TimerNumber = 2
$width = 32
```

TPP generates

```
wire [31:0] srCCount;
wire ccountWEn;
//-----------------------------------------------------------
// CCOUNT Register
//-----------------------------------------------------------
assign ccountWEn = srWEn_W && (srWrAdr_W == 'SRCCOUNT);
xtflop #(32) srcntreg (srCCount, (ccountWEn ? srDataIn_W :
srCCount+1),CLK);
//-----------------------------------------------------------
// CCOMPARE Register
//-----------------------------------------------------------
wire [31:0] srCCompare0;
wire ccompWEn0;
assign ccompWEn0 = srWEn_W &&
(srWrAdr_W == 'SRCCOMPARE0);
xtenflop #(32) srccmp0reg
(srCCompare0,srDataIn_W,ccompWEn0,CLK);
assign setCCompIntr0 = (srCCompare0 == srCCount);
assign clrCCompIntr0 = ccompWEn0;
//-----------------------------------------------------------
// CCOMPARE Register
//-----------------------------------------------------------
wire [31:0] srCCompare1;
wire ccompWEn1;
assign ccompWEn1 = srWEn_W &&
(srWrAdr_W == 'SRCCOMPARE1);
xtenflop #(32) srccmp1reg
(srCCompare1,srDataIn_W, ccompWEn1,CLK);
assign setCCompIntr1 = (srCCompare1 == srCCount);
assign clrCCompIntr1 = ccompWEn1;
```

The HDL description 114 thus generated is used to synthesize hardware for processor implementation using, e.g., the DesignCompiler™ manufactured by Synopsys Corporation in block 122. The result is then placed and routed using, e.g., Silicon Ensemble™ by Cadence Corporation or Apollo™ by Avant! Corporation in block 128. Once the components have been routed, the result can be used for wire back-annotation and timing verification in block 132 using, e.g., PrimeTime™ by Synopsys. The product of this process is a hardware profile 134 which can be used by the user to provide further input to the configuration capture routine 20 for further configuration iterations.

As mentioned in connection with the logic synthesis section 122, one of the outcomes of configuring the processor 60 is a set of customized HDL files from which specific gate-level implementation can be obtained by using any of a number of commercial synthesis tools. One such a tool is Design Compiler™ from Synopsys. To ensure correct and high performance gate-level implementation, the preferred embodiment provides scripts necessary to automate the synthesis process in the customer environment. The challenge in providing such scripts is to support a wide variety of synthesis methodologies and different implementation objectives of users. To address the first challenge, the preferred embodiment breaks the scripts into smaller and functionally complete scripts. One such example is to provide a read script that can read all HDL files relevant to the particular processor configuration 60, a timing constraint script to set the unique timing requirement in the processor 60, and a script to write out synthesis results in a way that can be used for the placement and routing of the gate-level netlist. To address the second challenge, the preferred embodiment provides a script for each implementation objective. One such example is to provide a script for achieving fastest cycle time, a script for achieving minimum silicon area, and a script for achieving minimum power consumption.

Scripts are used in other phases of processor configuration as well. For example, once the HDL model of the processor 60 has been written, a simulator can be used to verify the correct operation of the processor 60 as described above in connection with block 132. This is often accomplished by running many test programs, or diagnostics, on the simulated processor 60. Running a test program on the simulated processor 60 can require many steps such as generating an executable image of the test program, generating a representation of this executable image which can be read by the simulator 112, creating a temporary place where the results of the simulation can be gathered for future analysis, analyzing the results of the simulation, and so on. In the prior art this was done with a number of throw-away scripts. These scripts had some built-in knowledge of the simulation environment, such as which HDL files should be included, where those files could be found in the directory structure, which files are required for the test bench, and so on. In the current design the preferred mechanism is to write a script template which is configured by parameter substitution. The configuration mechanism also uses TPP to generate a list of the files that are required for simulation. Furthermore, in the verification process of block 132 it is often necessary to write other scripts which allow designers to run a series of test programs. This is often used to run regression suites that give a designer confidence that a given change in the HDL model does not introduce new bugs. These regression scripts were also often throw-away as they had many built-in assumptions about files names, locations, etc. As described above for the creation of a run script for a single test program the regression script is written as a template. This template is configured by substituting parameters for actual values at configuration time.

The final step in the process of converting an RTL description to a hardware implementation is to use a place and route (P&R) software to convert the abstract netlist into a geometrical representation. The P&R software analyzes the connectivity of the netlist and decides upon the placement of the cells. It then tries to draw the connections between all the cells. The clock net usually deserves special attention and is routed as a last step. This process can be both helped by providing the tools with some information, such as which cells are expected to be close together (known as soft grouping), relative placement of cells, which nets are expected to have small propagation delays, and so on.

To make this process easier and to ensure that the desired performance goals are met—cycle time, area, power dissipation—the configuration mechanism produces a set of scripts or input files for the P&R software. These scripts contain information as described above such as relative placements for cells. The scripts also contain information such as how many supply and ground connections are required, how these should be distributed along the boundary, etc. The scripts are generated by querying a database that contains information on how many soft groups to create and what cells should be contained in them, which nets are timing critical, etc. These parameters change based on which options have been selected. These scripts must be configurable depending on the tools to be used to do the place and route.

Optionally the configuration mechanism can request more information from the user and pass it to the P&R scripts. For example the interface can ask the user the desired aspect ratio of the final layout, how many levels of buffering should be inserted in the clock tree, which side the input and output pins should be located on, relative, or absolute, placement of these pins, width and location of the power and ground straps, and so on. These parameters would then be passed on to the P&R scripts to generate the desired layout.

Even more sophisticated scripts can be used that allow for example a more sophisticated clock tree. One common optimization done to reduce power dissipation is to gate the clock signal. However, this makes clock tree synthesis a much harder problem since it is more difficult to balance the delay of all branches. The configuration interface could ask the user for the correct cells to use for the clock tree and the perform part, or all, of the clock tree synthesis. It would do this by having some knowledge of where the gated clocks are located in the design and estimating the delay form the qualifying gate to the clock input of the flip flops. It would than give a constraint to the clock tree synthesis tool to match the delay of the clock buffer with the delay of the gating cells. In the current implementation this is done by a general purpose Perl script. This script reads gated clock information produced by the configuration agent based on which options are selected. The Perl script is run once the design has been placed and routed but before final clock tree synthesis is done.

Further improvement can be made to the profile process described above. Specifically, we will describe a process by which the user can obtain the similar hardware profile information almost instantaneously without spending hours running those CAD tools. This process has several steps.

The first step in this process is to partition the set of all configuration options into groups of orthogonal options such that effect of an option in a group on the hardware profile is independent of options in any other group. For example, the impact of MAC 16 unit to the hardware profile is independent of any other options. So, an option group with only the MAC 16 option is formed. A more complicated example is an option group containing interrupt options, high-level interrupt options and timer options, since the impact on the hardware profile is determined by the particular combination of these options.

The second step is to characterize the hardware profile impact of each option groups. The characterization is done by obtaining hardware profile impact for various combinations of options in the group. For each combination, the profile is obtained using a previously-described process in which an actual implementation is derived and its hardware profile is measured. Such information is stored in an estimation database.

The last step is to derive specific formulae for computing hardware profile impact by particular combinations of options in the option groups using curve fitting and interpolation techniques. Depending on the nature of the options, different formulae are used. For example, since each additional interrupt vector adds about the same logic to the hardware, we use linear function to model its hardware impact. In another example, having a timer unit requires the high-priority interrupt option, so the formula for hardware impact of the timer option is conditional formulae involving several options.

It is useful to provide quick feedback on how architectural choices may affect the runtime performance and code size of applications. Several sets of benchmark programs from multiple application domains are chosen. For each domain, a database is prebuilt that estimates how different architectural design decisions will affect the runtime performance and code size of the applications in the domain. As the user varies the architectural design, the database is queried for the application domain that interests the user or for multiple domains. The results of the evaluation are presented to the user so she can get an estimate on the tradeoff between software benefits and hardware costs.

The quick evaluation system can be easily extended to provide the user with suggestions on how to modify a configuration to further optimize the processor. One such example is to associate each configuration option with a set of numbers representing the incremental impact of the option on various cost metrics such as area, delay and power. Computing the incremental cost impact for a given option is made easy with the quick evaluation system. It simply involves two calls to the evaluation system, with and without the option. The difference in the costs for the two evaluations represents the incremental impact of the option. For example, the incremental area impact of the MAC 16 option is computed by evaluating the area cost of two configurations, with and without the MAC 16 option. The difference is then displayed with the MAC 16 option in the interactive configuration system. Such a system can guide the user toward an optimal solution through a series of single-step improvements.

Moving on to the software side of the automated processor configuration process, the preferred embodiment of this invention configures software development tools 30 so that they are specific to the processor. The configuration process begins with software tools 30 that can be ported to a variety of different systems and instruction set architectures. Such retargetable tools have been widely studied and are well-known in the art. The preferred embodiment uses the GNU family of tools, which is free software, including for example, the GNU C compiler, GNU assembler, GNU debugger, GNU linker, GNU profiler, and various utility programs. These tools 30 are then automatically configured by generating portions of the software directly from the ISA description and by using TPP to modify portions of the software that are written by hand.

The GNU C compiler is configured in several different ways. Given the core ISA description, much of the machine-dependent logic in the compiler can be written by hand. This portion of the compiler is common to all configurations of the configurable processor instruction set, and retargeting by hand allows fine-tuning for best results. However, even for this hand-coded portion of the compiler, some code is generated automatically from the ISA description. Specifically, the ISA description defines the sets of constant values that can be used in immediate fields of various instructions. For each immediate field, a predicate function is generated to test if a particular constant value can be encoded in the field. The compiler uses these predicate functions when generating code for the processor 60. Automating this aspect of the compiler configuration eliminates an opportunity for inconsistency between the ISA description and the compiler, and it enables changing the constants in the ISA with minimal effort.

Several aspects of the compiler are configured via preprocessing with TPP. For the configuration options controlled by parameter selection, corresponding parameters in the compiler are set via TPP. For example, the compiler has a flag variable to indicate whether the target processor 60 uses big endian or little endian byte ordering, and this variable is set automatically using a TPP command that reads the endianness parameter from the configuration specification 100. TPP is also used to conditionally enable or disable hand-coded portions of the compiler which generate code for optional ISA packages, based on whether the corresponding packages are enabled in the configuration specification 100. For example, the code to generate multiply/accumulate instructions is only included in the compiler if the configuration specification includes the MAC 16 option 90.

The compiler is also configured to support designer-defined instructions specified via the TIE language. There are two levels of this support. At the lowest level, the designer-defined instructions are available as macros, intrinsic functions, or inline (extrinsic) functions in the code being compiled. The preferred embodiment of this invention generates a C header file defining inline functions as "inline assembly" code (a standard feature of the GNU C compiler). Given the TIE specification of the designer-defined opcodes and their corresponding operands, generating this header file is a straightforward process of translating to the GNU C compiler's inline assembly syntax. An alternative implementation creates a header file containing C preprocessor macros that specify the inline assembly instructions. Yet another alternative uses TPP to add intrinsic functions directly into the compiler.

The second level of support for designer-defined instructions is provided by having the compiler automatically recognize opportunities for using the instructions. These TIE instructions could be directly defined by the user or created automatically during the configuration process. Prior to compiling the user application, the TIE code is automatically examined and converted into C equivalent functions. This is the same step used to allow fast simulation of TIE instructions. The C equivalent functions are partially compiled into a tree-based intermediate representation used by the compiler. The representation for each TIE instruction is stored in a database. When the user application is compiled, part of the compilation process is a pattern matcher. The user application is compiled into the tree-based intermediate representation. The pattern matcher walks bottom-up every tree in the user program. At each step of the walk, the pattern matcher checks if the intermediate representation rooted at the current point matches any of the TIE instructions in the database. If there is a match, the match is noted. After finishing to walk each tree, the set of maximally sized matches are selected. Each maximal match in the tree is replaced with the equivalent TIE instruction.

The algorithm described above will automatically recognize opportunities to use stateless TIE instructions. Additional approaches can also be used to automatically recognize opportunities to use TIE instructions with state. A previous section described algorithms for automatically selecting potential TIE instructions with state. The same algorithms are used to automatically use the TIE instructions in C or C++ applications. When a TIE coprocessor has been defined to have more registers but a limited set of operations, regions of code are scanned to see if they suffer from register spilling and if those regions only use the set of available operations. If such regions are found, the code in those regions is automatically changed to use the coprocessor instructions and registers 98. Conversion operations are generated at the boundaries of the region to move the data in and out of the coprocessor 98. Similarly, if a TIE coprocessor has been defined to work on different size integers, regions of the code are examined to see if all data in the region is accessed as if it were the different size. For matching regions, the code is changed and glue code is added at the boundaries. Similarly if a TIE coprocessor 98 has been defined to implement a C++ abstract data type, all the operations in that data type are replaced with the TIE coprocessor instructions.

Note that suggesting TIE instructions automatically and utilizing TIE instructions automatically are both useful independently. Suggested TIE instructions can also be manually used by the user via the intrinsic mechanism and utilizing algorithms can be applied to TIE instructions or coprocessors 98 designed manually.

Regardless of how designer-designed instructions are generated, either via inline functions or by automatic recognition, the compiler needs to know the potential side effects of the designer-defined instructions so that it can optimize and schedule these instructions. In order to improve performance, traditional compilers optimize user codes in order to maximize desired characteristics such as run-time performance, code size or power consumption. As is known to one well-versed in the art, such optimizations include things such as rearranging instructions or replacing certain instructions with other, semantically equivalent instructions. In order to perform optimizations well, the compiler must know how every instruction affects different portions of the machine. Two instructions that read and write different portions of the machine state can be freely reordered. Two instructions that access the same portion of the machine state can not always be reordered. For traditional processors, the state read and/or written by different instructions is hardwired, sometimes by table, into the compiler. In one embodiment of this invention, TIE instructions are conservatively assumed to read and write all the state of the processor 60. This allows the compiler to generate correct code but limits the ability of the compiler to optimize code in the presence of TIE instructions. In another embodiment of this invention, a tool automatically reads the TIE definition and for each TIE instruction discovers which state is read or written by said instruction. This tool then modifies the tables used by the compiler's optimizer to accurately model the effect of each TIE instruction.

Like the compiler, the machine-dependent portions of the assembler 110 include both automatically generated parts and hand-coded parts configured with TPP. Some of the features common to all configurations are supported with code written by hand. However, the primary task of the assembler 110 is to encode machine instructions, and instruction encoding and decoding software can be generated automatically from the ISA description.

Because instruction encoding and decoding are useful in several different software tools, the preferred embodiment of this invention groups the software to perform those tasks into a separate software library. This library is generated automatically using the information in the ISA description. The library defines an enumeration of the opcodes, a function to efficiently map strings for opcode mnemonics onto members of the enumeration (stringToOpcode), and tables that for each opcode specify the instruction length (instructionLength), number of operands (numberOfOperands), operand fields, operand types (i.e., register or immediate) (operandType), binary encoding (encodeOpcode), and mnemonic string (opcodeName). For each operand field, the library provides accessor functions to encode (fieldSetFunction) and decode (fieldGetFunction) the corresponding bits in the instruction word. All of this information is readily available in the ISA description; generating the library software is merely a matter of translating the information into executable C code. For example, the instruction encodings are recorded in a C array variable where each entry is the encoding for a particular instruction, produced by setting each opcode field to the value specified for that instruction in the ISA description; the encodeOpcode function simply returns the array value for a given opcode.

The library also provides a function to decode the opcode in a binary instruction (decode Instruction). This function is generated as a sequence of nested switch statements, where the outermost switch tests the subopcode field at the top of the opcode hierarchy, and the nested switch statements test the subopcode fields progressively lower in the opcode hierarchy. The generated code for this function thus has the same structure as the opcode hierarchy itself.

Given this library for encoding and decoding instructions, the assembler 110 is easily implemented. For example, the instruction encoding logic in the assembler is quite simple:

```
AssembleInstruction (String mnemonic, int arguments[ ])
begin
    opcode = stringToOpcode(mnemonic);
    if (opcode == UNDEFINED)
        Error("Unknown opcode");
    instruction = encodeOpcode(opcode);
    numArgs = numberOfOperands(opcode);
    for i = 0, numArgs–1 do
    begin
        setFun = fieldSetFunction(opcode, i);
        setFun(instruction, arguments[i]);
    end
    return instruction;
end
```

Implementing a disassembler 110, which translates binary instructions into a readable form closely resembling assembly code, is equally straightforward:

```
DisassembleInstruction (BinaryInstruction instruction)
begin
    opcode = decodeInstruction(instruction);
    instructionAddress += instructionLength(opcode);
    print opcodeName(opcode);
    // Loop through the operands, disassembling each
    numArgs = numberOfOperands(opcode);
    for i = 0, numArgs–1 do
```

-continued

```
begin
    type = operandType(opcode, i);
    getFun = fieldGetFunction(opcode, i);
    value = getFun(opcode, i, instruction);
    if (i != 0) print ","; // Comma separate operands
    // Print based on the type of the operand
    switch (type)
    case register:
        print registerPrefix(type), value;
    case immediate:
        print value;
    case pc_relative_label:
        print instructionAddress + value;
    // etc. for more different operand types
    end
end
```

This disassembler algorithm is used in a standalone disassembler tool and also in the debugger 130 to support debugging of machine code.

The linker is less sensitive to the configuration than the compiler and assembler 110. Much of the linker is standard and even the machine-dependent portions depend primarily on the core ISA description and can be hand-coded for a particular core ISA. Parameters such as endianness are set from the configuration specification 100 using TPP. The memory map of the target processor 60 is one other aspect of the configuration that is needed by the linker. As before, the parameters that specify the memory map are inserted into the linker using TPP. In the preferred embodiment of the invention, the GNU linker is driven by a set of linker scripts, and it is these linker scripts that contain the memory map information. An advantage of this approach is that additional linker scripts can be generated later, without reconfiguring the processor 60 and without rebuilding the linker, if the memory map of the target system is different than the memory map specified when the processor 60 was configured. Thus, the preferred embodiment includes a tool to configure new linker scripts with different memory map parameters.

The debugger 130 provides mechanisms to observe the state of a program as it runs, to single-step the execution one instruction at a time, to introduce breakpoints, and to perform other standard debugging tasks. The program being debugged can be run either on a hardware implementation of the configured processor or on the ISS 126. The debugger presents the same interface to the user in either case. When the program is run on a hardware implementation, a small monitor program is included on the target system to control the execution of the user's program and to communicate with the debugger via a serial port. When the program is run on the simulator 126, the simulator 126 itself performs those functions. The debugger 130 depends on the configuration in several ways. It is linked with the instruction encoding/decoding library described above to support disassembling machine code from within the debugger 130. The part of the debugger 130 that displays the processor's register state, and the parts of the debug monitor program and ISS 126 that provide that information to the debugger 130, are generated by scanning the ISA description to find which registers exist in the processor 60.

Other software development tools 30 are standard and need not be changed for each processor configuration. The profile viewer and various utility programs fall into this category. These tools may need to be retargeted once to operate on files in the binary format shared by all configurations of the processor 60, but they do not depend on either the ISA description or the other parameters in the configuration specification 100.

Figure 13:
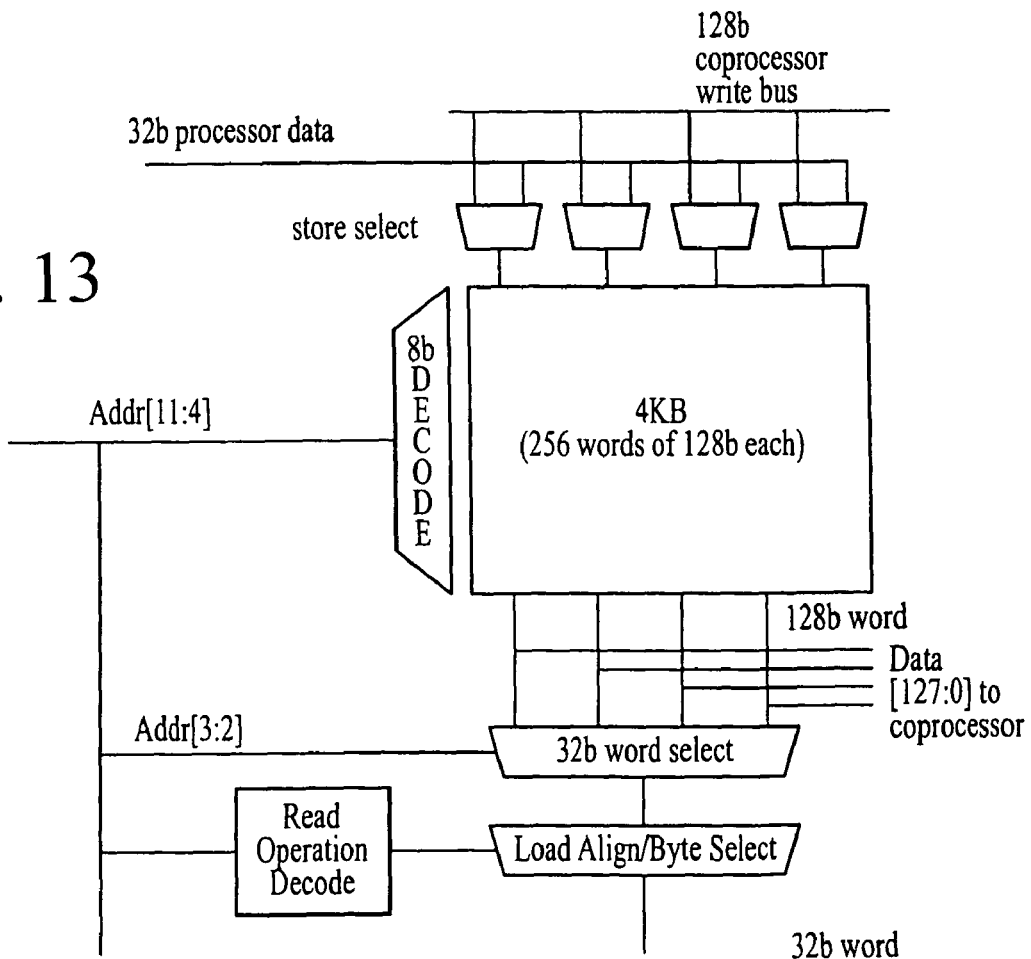
Figure 14:
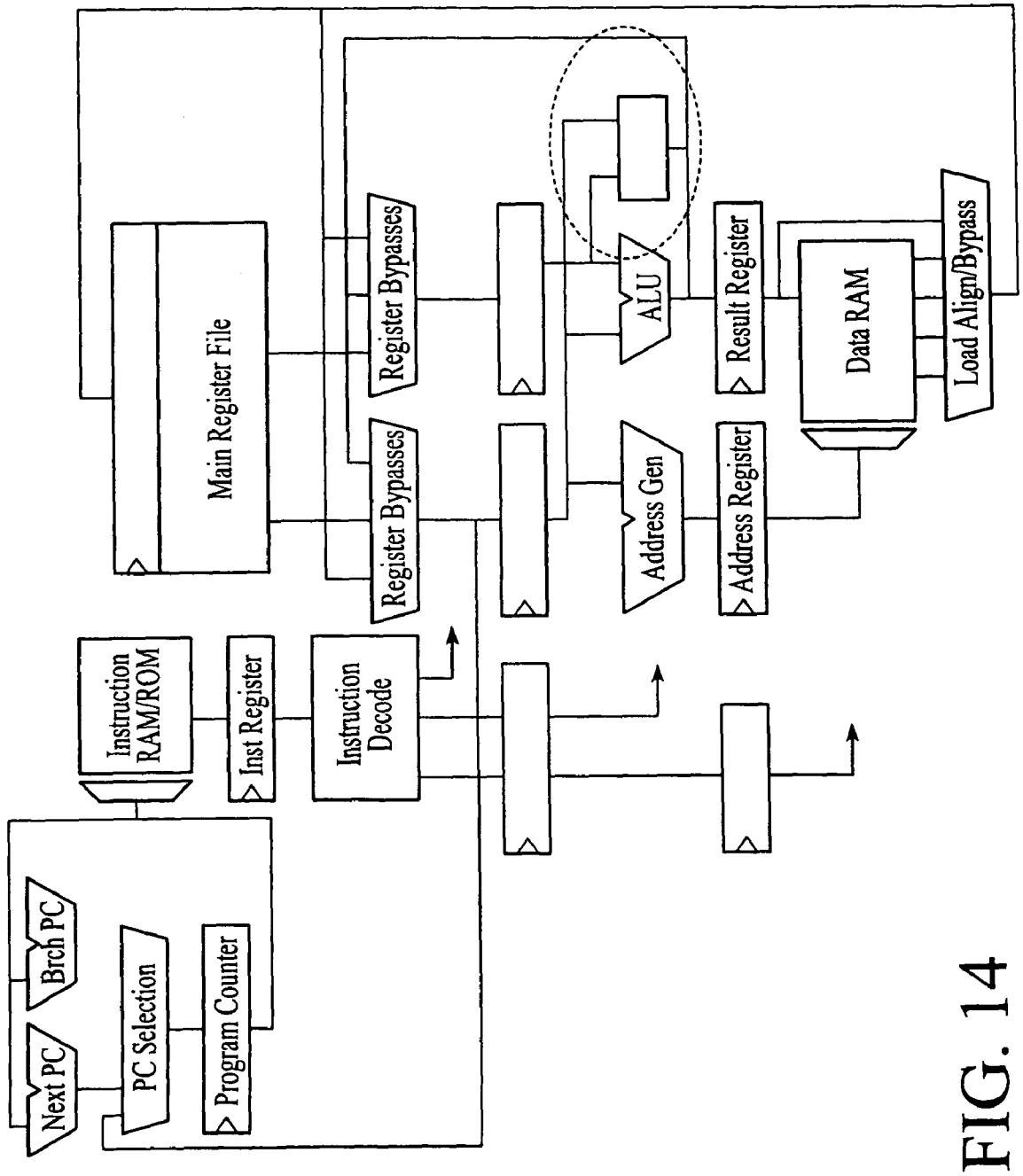
FIGS. 14 and 15 are diagrams showing the addition of user defined functional units in the architecture of FIG. 8.
Figure 15:
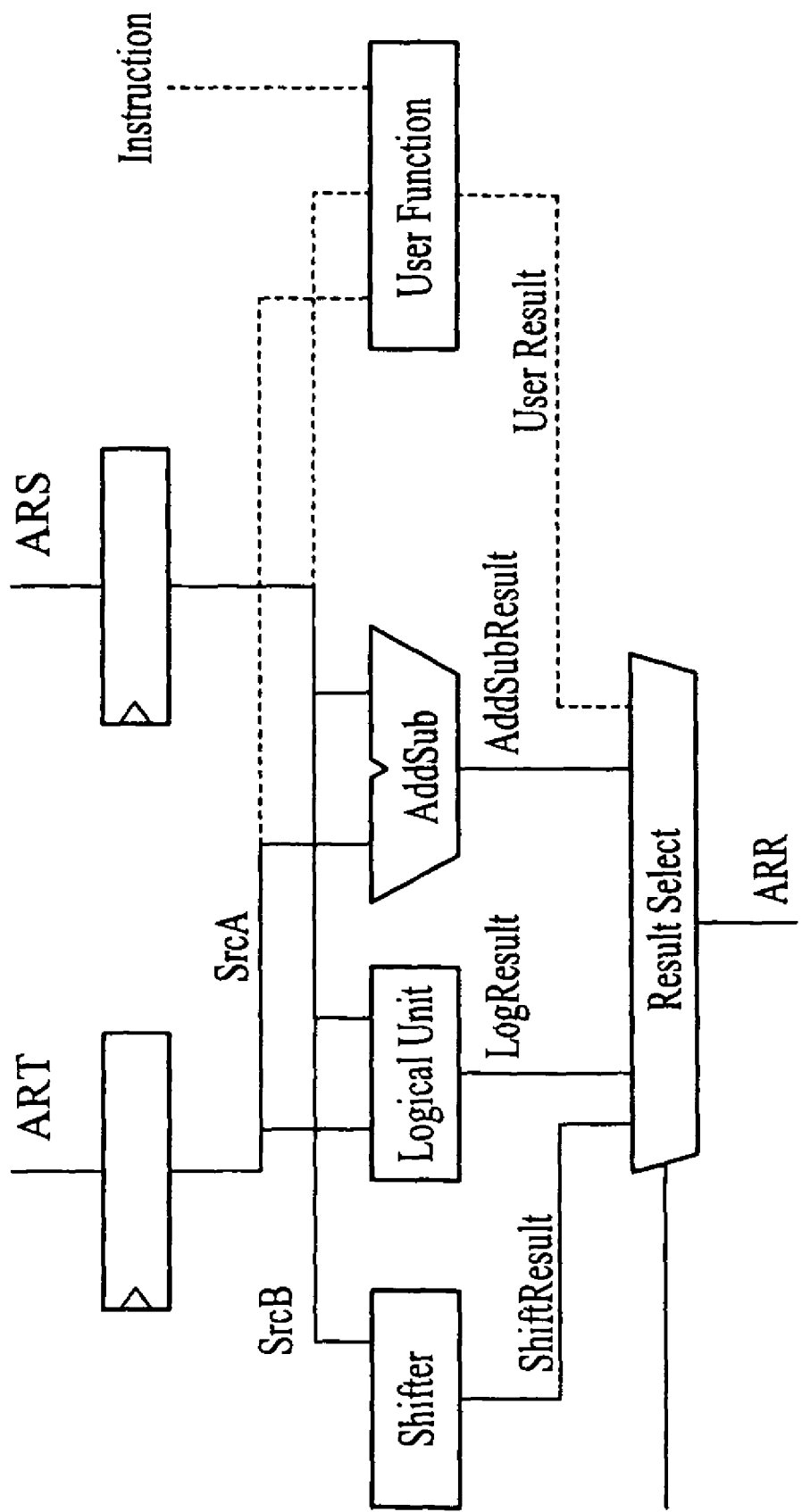

The configuration specification is also used to configure a simulator called the ISS 126 shown in FIG. 13. The ISS 126 is a software application that models the functional behavior of the configurable processor instruction set. Unlike its counterpart processor hardware model simulators such as Synopsys VCS and Cadence Verilog XL and NC simulators, the ISS HDL model is an abstraction of the CPU during its instruction execution. The ISS 126 can run much faster than a hardware simulation because it does not need to model every signal transition for every gate and register in the complete processor design.

The ISS 126 allows programs generated for the configured processor 60 to be executed on a host computer. It accurately reproduces the processor's reset and interrupt behavior allowing low-level programs such as device drivers and initialization code to be developed. This is particularly useful when porting native code to an embedded application.

The ISS 126 can be used to identify potential problems such as architectural assumptions, memory ordering considerations and the like without needing to download the code to the actual embedded target.

In the preferred embodiment, ISS semantics are expressed textually using a C-like language to build C operator building blocks that turn instructions into functions. For example, the rudimentary functionality of an interrupt, e.g., interrupt register, bit setting, interrupt level, vectors, etc., is modeled using this language.

The configurable ISS 126 is used for the following four purposes or goals as part of the system design and verification process:

debugging software applications before hardware becomes available;

debugging system software (e.g., compilers and operating system components);

comparing with HDL simulation for hardware design verification. ISS serves as a reference implementation of the ISA—the ISS and processor HDL are both run for diagnostics and applications during processor design verification and traces from the two are compared; and analyzing software application performance (this may be part of the configuration process, or it may be used for further application tuning after a processor configuration has been selected).

All the goals require that the ISS 126 be able to load and decode programs produced with the configurable assembler 110 and linker. They also require that ISS execution of instructions be semantically equivalent to the corresponding hardware execution and to the compiler's expectations. For these reasons, the ISS 126 derives its decode and execution behavior from the same ISA files used to define the hardware and system software.

For the first and last goals listed above, it is important for the ISS 126 to be as fast as possible for the required accuracy. The ISS 126 therefore permits dynamic control of the level of detail of the simulation. For example, cache details are not modeled unless requested, and cache modeling can be turned off and on dynamically. In addition, parts of the ISS 126 (e.g., cache and pipeline models) are configured before the ISS 126 is compiled so that the ISS 126 makes very few configuration-dependent choices of behavior at runtime. In this way, all ISS configurable behavior is derived from well-defined sources related to other parts of the system.

For the first and third goals listed above, it is important for the ISS 126 to provide operating system services to applications when these services are not yet available from the OS for the system under design (the target). It is also important for these services to be provided by the target OS when that is a relevant part of the debugging process. In this way the system provides a design for flexibly moving these services between ISS host and simulation target. The current design relies on a combination of ISS dynamic control (trapping SYSCALL instructions may be turned on and off) and the use of a special SIMCALL instruction to request host OS services.

The last goal requires the ISS 126 to model some aspects of processor and system behavior that are below the level specified by the ISA. In particular, the ISS cache models are constructed by generating C code for the models from Perl scripts which extract parameters from the configuration database 100. In addition, details of the pipeline behavior of instructions (e.g., interlocks based on register use and functional-unit availability requirements) are also derived from the configuration database 100. In the current implementation, a special pipeline description file specifies this information in a lisp-like syntax.

The third goal requires precise control of interrupt behavior. For this purpose, a special non-architectural register in the ISS 126 is used to suppress interrupt enables.

The ISS 126 provides several interfaces to support the different goals for its use:

a batch or command line mode (generally used in connection with the first and last goals);

a command loop mode, which provides non-symbolic debug capabilities, e.g. breakpoints, watchpoints, step, etc.— frequently used for all four goals; and a socket interface which allows the ISS 126 to be used by a software debugger as an execution backend (this must be configured to read and write the register state for the particular configuration selected).

a scriptable interface which allows very detailed debugging and performance analysis. In particular, this interface may be used to compare application behavior on different configurations. For example, at any breakpoint the state from a run on one configuration may be compared with or transferred to the state from a run on another configuration.

The simulator 126 also has both hand-coded and automatically generated portions. The hand-coded portions are conventional, except for the instruction decode and execution, which are created from tables generated from the ISA description language. The tables decode the instruction by starting from the primary opcode found in the instruction word to be executed, indexing into a table with the value of that field, and continuing until a leaf opcode, i.e., an opcode which is not defined in terms of other opcodes, is found. The tables then give a pointer to the code translated from the TIE code specified in the semantics declaration for the instruction. This code is executed to simulate the instruction.

The ISS 126 can optionally profile the execution of the program being simulated. This profiling uses a program counter sampling technique known in the art. At regular intervals, the simulator 126 samples the PC (program counter) of the processor being simulated. It builds a histogram with the number of samples in each region of code. The simulator 126 also counts the number of times each edge in the call graph is executed by incrementing a counter whenever a call instruction is simulated. When the simulation is complete, the simulator 126 writes an output file containing both the histogram and call graph edge counts in a format that can be read by a standard profile viewer. Because the program 118 being simulated need not be modified with instrumentation code (as in standard profiling techniques), the profiling overhead does not affect the simulation results and the profiling is totally non-invasive.

Figure 6:
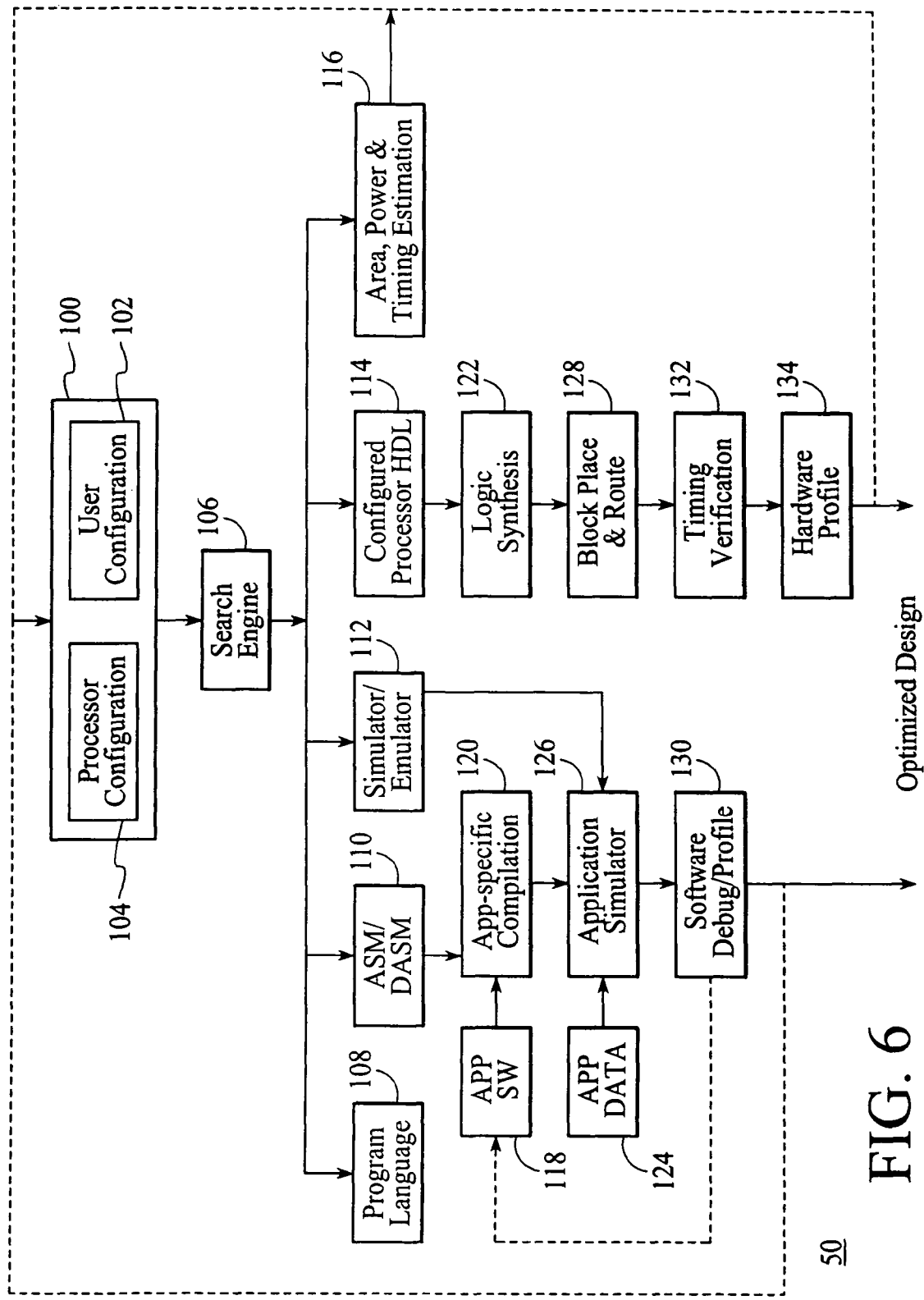
FIG. 6 shows the flow of processor configuration according to the preferred embodiment.

It is preferable that the system make available hardware processor emulation as well as software processor emulation. For this purpose, the preferred embodiment provides an emulation board. As shown in FIG. 6, the emulation board 200 uses a complex programmable logic device 202 such as the Altera Flex 10K200E to emulate, in hardware, a processor configuration 60. Once programmed with the processor netlist generated by the system, the CPLD device 202 is functionally equivalent to the final ASIC product. It provides the advantage that a physical implementation of the processor 60 is available that can run much faster than other simulation methods (like the ISS 126 or HDL) and is cycle accurate. However, it cannot reach the high frequency targets that the final ASIC device can get to.

This board enables the designer to evaluate various processor configuration options and start software development and debugging early in the design cycle. It can also be used for the functional verification of the processor configuration.

The emulation board 200 has several resources available on it to allow for easy software development, debugging and verification. These include the CPLD device 202 itself, EPROM 204, SRAM 206, synchronous SRAM 208, flash memory 210 and two RS232 serial channels 212. The serial channels 212 provide a communication link to UNIX or PC hosts for downloading and debugging user programs. The configuration of a processor 60, in terms of the CPLD netlist, is downloaded into the CPLD 202 through a dedicated serial link to device's configuration port 214 or through dedicated configuration ROMs 216.

The resources available on the board 200 are configurable to a degree as well. The memory map of the various memory elements on the board can be easily changed, because the mapping is done through a Programmable Logic Device (PLD) 217 which can be easily changed. Also, the caches 218 and 228 that the processor core uses are expandable by using larger memory devices and appropriately sizing the tag busses 222 and 224 that connect to the caches 218 and 228.

Using the board to emulate a particular processor configuration involves several steps. The first step is to obtain a set of RTL files which describe the particular configuration of the processor. The next step is to synthesize a gate-level netlist from the RTL description using any of a number of commercial synthesis tools. One such example is FPGA Express from Synopsys. The gate-level netlist can then be used to obtain a CPLD implementation using tools typically provided by vendors. One such tool is Maxplus2 from Altera Corporation. The final step is to download the implementation onto the CPLD chip on the emulation board using programmers provided again by the CPLD vendors.

Since one of the purposes of the emulation board is to support quick prototype implementation for debugging purposes, it is important that the CPLD implementation process outlined in the previous paragraph is automatic. To achieve this objective, the files delivered to users are customized by grouping all relevant files into a single directory. Then, a fully customized synthesis script is provided to be able to synthesize the particular processor configuration to the particular FPGA device selected by the customer. A fully customized implementation script to be used by the vendor tools is also generated. Such synthesis and implementation scripts guarantee functionally correct implementation with optimal performance. The functional correctness is achieved by including appropriate commands in the script to read in all RTL files relevant to the specific processor configuration by including appropriate commands to assign chip-pin locations based on I/O signals in the processor configuration and by including commands to obtain specific logic implementation for certain critical portions of the processor logic such at gated clocks. The script also improves the performance of the implementation by assigning detailed timing constraint to all processor I/O signals and by special processing of certain critical signals. One such example for timing constraints is assigning a specific input delay to a signal by taking into account the delay of that signal on the board. An example of critical signal treatment is to assign the clock signal to a dedicated global wire in order to achieve low clock skews on the CPLD chip.

Preferably, the system also configures a verification suite for the configured processor 60.

Most verification of complex designs like microprocessors consists of a flow as follows:

build a test bench to stimulate the design and compare output either within the testbench or using an external model like the ISS 126;

write diagnostics to generate the stimulus;

measure coverage of verification using schemes like line coverage of finite state machine coverage HDL, declining bug rate, number of vectors run on the design; and if the coverage is not sufficient—write more diagnostics and maybe use tools to generate diagnostics to exercise the design further.

The present invention uses a flow that is somewhat similar, but all components of the flow are modified to account for the configurability of the design. This methodology consists of the following steps:

build a testbench for a particular configuration. Configuration of the testbench uses a similar approach as that described for the HDL and supports all options and extensions supported therein, i.e., cache sizes, bus interface, clocking, interrupt generation etc.;

run self-checking diagnostics on a particular configuration of the HDL. Diagnostics themselves are configurable to tailor them for a particular piece of hardware. The selection of which diagnostics to run is also dependent on the configuration;

run pseudo-randomly generated diagnostics and compare the processor state after the execution of each instruction against the ISS 126; and measure of coverage of verification—using coverage tools that measure functional as well as line coverage. Also, monitors and checkers are run along with the diagnostics to look for illegal states and conditions. All of these are configurable for a particular configuration specification.

All of the verification components are configurable. The configurability is implemented using TPP.

A test bench is a Verilog™ model of a system in which the configured processor 60 is placed. In the case of the present invention these test benches include:

caches, bus interface, external memory;

external interrupts and bus error generation; and clock generation.

Since almost all of the above characteristics are configurable, the test bench itself needs to support configurability. So, for example, the cache size and width and number of external interrupts are automatically adjusted based on configuration.

The testbench provides stimulus to the device under test—the processor 60. It does this by providing assembly level instructions (from diagnostics) that are preloaded into memory. It also generates signals that control the behavior of the processor 60—for example, interrupts. Also, the frequency and timing of these external signals is controllable and is automatically generated by the testbench.

There are two types of configurability for diagnostics. First, diagnostics use TPP to determine what to test. For example, a diagnostic has been written to test software interrupts. This diagnostic will need to know how many software interrupts there are in order to generate the right assembly code.

Second, the processor configuration system 10 must decide which diagnostics are suitable for this configuration. For example, a diagnostic written to test the MAC unit is not applicable to a processor 60 which does not include this unit. In the preferred embodiment this is accomplished through the use of a database containing information about each diagnostic. The database may contain for each diagnostic the following information:

use the diagnostic if a certain option has been selected;

if the diagnostic cannot be run with interrupts;

if the diagnostic requires special libraries or handlers to run; and if the diagnostic cannot be run with cosimulation with ISS 126.

Preferably the processor hardware description includes three types of test tools: test generator tools, monitors and coverage tools (or checkers), and a cosimulation mechanism. Test generation tools are tools that create a series of processor instructions in an intelligent fashion. They are sequences of pseudo-random test generators. The preferred embodiment uses two types internally—a specially-developed one called RTPG and another which is based on an external tool called VERA (VSG). Both have configurability built around them. Based on valid instructions for a configuration, they will generate a series of instructions. These tools will also be able to deal with newly defined instructions from TIE—so that these newly defined instructions are randomly generated for testing. The preferred embodiment includes monitors and checkers that measure the coverage of the design verification.

Monitors and coverage tools are tools that are run alongside a regression run. Coverage tools monitor what the diagnostic is doing and the functions and logic of the HDL that it is exercising. All this information is collected throughout the regression run and is later analyzed to get some hints of what parts of the logic need further testing. The preferred embodiment uses several functional coverage tools that are configurable. For example, for a particular finite state machine not all states are included depending on a configuration. So, for that configuration the functional coverage tool must not try to check for those states or transitions. This is accomplished by making the tool configurable through TPP.

Similarly, there are monitors that check for illegal conditions occurring within the HDL simulation. These illegal conditions could show up as bugs. For example on a three-state bus, 2 drivers should not be on simultaneously. These monitors are configurable—adding or removing checks based on whether a particular logic is included or not for that configuration.

The cosimulation mechanism connects the HDL to the ISS 126. It is used to check that the state of the processor at the end of the instruction is identical in the HDL and the ISS 126. It too is configurable to the extent that it knows what features are included for each configuration and what state needs to be compared. So, for example, the data breakpoint feature adds a special register. This mechanism needs to know to compare this new special register.

Instruction semantics specified via TIE can be translated to functionally equivalent C functions for use in the ISS 126 and for system designers to use for testing and verification. The semantics of an instruction in the configuration database 106 are translated to a C function by tools that build a parse tree using standard parser tools, and then code that walks the tree and outputs the corresponding expressions in the C language. The translation requires a prepass to assign bit widths to all expressions and to rewrite the parse tree to simplify some translations. These translators are relatively simple compared to other translators, such as HDL to C or C to assembly language compilers, and can be written by one skilled in the art starting from the TIE and C language specification.

Using a compiler configured using the configuration file 100 and the assembler/disassembler 100, benchmark application source code 118 is compiled and assembled and, using a sample data set 124, simulated to obtain a software profile 130 which also is provided to the user configuration capture routine for feedback to the user.

Having the ability to obtain both the hardware and software cost/benefit characterizations for any configuration parameter selections opens up new opportunities for further optimization of the system by the designers. Specifically, this will enable designers to select the optimal configuration parameters which optimize the overall systems according to some figure of merit. One possible process is based on a greedy strategy, by repeatedly selecting or de-selecting a configuration parameter. At each step, the parameter that has the best impact on the overall system performance and cost is selected. This step is repeated until no single parameter can be changed to improve the system performance and cost. Other extensions include looking at a group of configuration parameters at a time or employing more sophisticated searching algorithms.

In addition to obtaining optimal configuration parameter selection, this process can also be used to construct optimal processor extensions. Because of the large number of possibilities in the processor extensions, it is important to restrict the number of extension candidates. One technique is to analyze the application software and only look at the instruction extensions that can improve the system performance or cost.

Having covered the operation of an automated processor configuration system according to the preferred embodiment, examples now will be given of application of the system to processor microarchitecture configuration. The first example shows the advantages of the present invention as applied to image compression.

Motion estimation is an important component of many image compression algorithms, including MPEG video and H263 conference applications. Video image compression attempts to use the similarities from one frame to the next to reduce the amount of storage required for each frame. In the simplest case, each block of an image to be compressed can be compared to the corresponding block (the same X,Y location) of the reference image (one that closely precedes or follows the image being compressed). The compression of the image differences between frames is generally more bit-efficient than compression of the individual images. In video sequences, the distinctive image features often move from frame to frame, so the closest correspondence between blocks in different frames is often not at exactly the same X,Y location, but at some offset. If significant parts of the image are moving between frames, it may be necessary to identify and compensate for the movement, before computing the difference. This fact means that the densest representation can be achieved by encoding the difference between successive images, including, for distinctive features, an X, Y offset in the sub-images used in the computed difference. The offset in the location used for computing the image difference is called the motion vector.

The most computationally intensive task in this kind of image compression is the determination of the most appropriate motion vector for each block. The common metric for selecting the motion vector is to find the vector with the lowest average pixel-by-pixel difference between each block of the image being compressed and a set of candidate blocks of the previous image. The candidate blocks are the set of all the blocks in a neighborhood around the location of the block being compressed. The size of the image, the size of the block and size of the neighborhood all affect the running time of the motion estimation algorithm.

Simple block-based motion estimation compares each sub-image of the image to be compressed against a reference image. The reference image may precede or follow the subject image in the video sequence. In every case, the reference image is known to be available to the decompression system before the subject image is decompressed. The comparison of one block of an image under compression with candidate blocks of a reference image is illustrated below.

For each block in the subject image, a search is performed around the corresponding location in the reference image. Normally each color component (e.g., YUV) of the images is analyzed separately. Sometimes motion estimation is performed only on one component, especially luminance. The average pixel-by-pixel difference is computed between that subject block and every possible block in the search zone of the reference image. The difference is the absolute value of the difference in magnitude of the pixel values. The average is proportional to the sum over the $N^2$ pixels in the pair of blocks (where N is the dimension of the block). The block of the reference image that produces the smallest average pixel difference defines the motion vector for that block of the subject image.

The following example shows a simple form of a motion estimation algorithm, then optimizes the algorithm using TIE for a small application-specific functional unit. This optimization yields a speed-up of more than a factor of 10, making processor-based compression feasible for many video applications. It illustrates the power of a configurable processor that combines the ease of programming in a high-level language with the efficiency of special-purpose hardware.

This example uses two matrices, OldB and NewB, to respectively represent the old and new images. The size of the image is determined by NX and NY. The block size is determined by BLOCKX and BLOCKY. Therefore, the image is composed of NX/BLOCKX by NY/BLOCKY blocks. The search region around a block is determined by SEARCHX and SEARCHY. The best motion vectors and values are stored in VectX, VectY, and VectB. The best motion vectors and values computed by the base (reference) implementation are stored in BaseX; BaseY, and BaseB. These values are used to check against the vectors computed by the implementation using instruction extensions. These basic definitions are captured in the following C-code segment:

```
#define NX 64                                          /* image width */
#define NY 32                                          /* image height */
#define BLOCKX 16                                      /* block width */
#define BLOCKY 16                                      /* block height */
#define SEARCHX 4                                      /* search region
                                                          width */
#define SEARCHY 4                                      / search region height */
unsigned char O1dB[NX][NY];                            /* old image */
unsigned char NewB[NX][NY];                            /* new image */
unsigned short VectX[NX/BLOCKX][NY/BLOCKY];            /* X motion
                                                          vector */
unsigned short VectY[NX/BLOCKX][NY/BLOCKY];            /* Y motion
                                                          vector */
unsigned short VectB[NX/BLOCKX][NY/BLOCKY];            /* absolute
                                                          difference */
unsigned short BaseX[NX/BLOCKX][NY/BLOCKY];            /* Base X motion vector */
unsigned short BaseY[NX/BLOCKX][NY/BLOCKY];            / Base Y motion
                                                          vector */
unsigned short BaseB[NX/BLOCKX][NY/BLOCKY];            /* Base absolute
                                                          difference*/
#define ABS(x)     (((x) < 0) ? (-(x)) : (x))
#define MIN (x, y) (((x) < (y)) ? (x) : (y))
#define MAX (x, y) (((x) > (y)) ? (x) : (y))
#define ABSD(x,y)  (((x) > (y)) ? ((x) - (y)) : ((y) - (x)))
```

The motion estimation algorithm is comprised of three nested loops:

1. For each source block in the old image.
2. For each destination block of the new image in the surrounding region of the source block.
3. Compute the absolute difference between each pair of pixels.

The complete code for the algorithm is listed below.

```
/*************************************************************
    Reference software implementation
*************************************************************/
void
motion_estimate_base( )
{
    int bx, by, cx, Cyr x, y;
    int startx, starty, endx, endy;
    unsigned cliff, best, bestx, best y;
    for(bx = 0; bx < NX/BLOCKX; bx++)     {
        for (by = 0; by < NY/BLOCKY; by++)      {
            best = bestx = besty = UINT_MAX;
            startx = MAX(0, bx*BLOCKX - SEARCHX);
            starty = MAX(0, by*BLOCKY - SEARCHY);
            endx = MIN(NX-BLOCKX, bx*BLOCKX + SEARCHX);
            endy = MIN (NY-BLOCKY, by*BLOCKY + SEARCHY);
            for(cx = startx: cx < endx; cx++) {
                for(cy = starty; cy < endy; cy++) {
                    diff = 0;
                    for(x = 0; x < BLOCKX; x++) {
                        for(y = 0; y < BLOCKY; y++) {
                            diff += ABSD(O1dB[cx+x][cy+y],
                                NewB[bx*BLOCKX+x][by*BLOCKY+y]);
                        }
                    }
                    if (diff < best) {
                        best = cliff;
                        bestx = cx;
                        besty = cy;
                    }
                }
            }
            BaseX[bx][by] = bestx;
            BaseY[bx][by] = besty;
            BaseB[bx][by] = best;
        }
    }
}
```

While the basic implementation is simple, it fails to exploit much of the intrinsic parallelism of this block to block comparison. The configurable processor architecture provides two key tools to allow significant speed-up of this application.

First, the instruction set architecture includes powerful funnel shifting primitives to permit rapid extraction of unaligned fields in memory. This allows the inner loop of the pixel comparison to fetch groups of adjacent pixels from memory efficiently. The loop can then be rewritten to operate on four pixels (bytes) simultaneously. In particular, for the purposes of this example it is desirable to define a new instruction to compute the absolute difference of four pixel pairs at a time. Before defining this new instruction, however, it is necessary to re-implement the algorithm to make use of such an instruction.

The presence of this instruction allows such improvement in the inner loop pixel difference computation that loop unrolling becomes attractive as well. The C code for the inner loop is rewritten to take advantage of the new sum-of-absolute-differences instruction and the efficient shifting. Part of four overlapping blocks of the reference image can then be compared in the same loop. SAD (x, y) is the new intrinsic function corresponding to the added instruction. SRC (x, y) performs a right shift of the concatenation of x and y by the shift amount stored in the SAR register.

```
/*************************************************************
    Fast version of motion estimation which uses the SAD
        instruction.
*************************************************************/
void
motion_estimate_tie( )
{
    int bx, by, cx, cy, x;
    int startx, starty, endx, endy;
    unsigned diff0, diff1, diff2, diff3, best, bestx, besty;
    unsigned *N, N1, N2, N3, N4, *O, A, B, C, D, E;
    for(bx = 0; bx < NX/BLOCKX; bx++) {
        for(by = 0; by < NY/BLOCKY; by++) {
            best = bestx = besty = UINT_MAX;
            startx = MAX(0, bx*BLOCKX - SEARCHX);
            starty = MAX(0, by*BLOCKY - SEARCHY);
            endx = MIN(NX-BLOCKX, bx*BLOCKX + SEARCHX);
            endy = MIN(NY-BLOCKY, by*BLOCKY + SEARCHY);
            for(cy = starty; cy < endy; cy += sizeof(long)) {
                for(cx = startx; cx < endx; cx++) {
                    diff0 = diff1 = diff2 = diff3 = 0;
                    for(x = 0; x < BLOCKX; x++) {
                        N = (unsigned *) & (NewB[bx*BLOCKX+x]
                            [by*BLOCKY]);
                        N1 = N[0];
                        N2 = N[1];
                        N3 = N[2];
                        N4 = N[3];
                        O = (unsigned *) &(O1dB[cx+x][cy]);
                        A = O[0];
                        B = O[1];
                        C = O[2];
                        D = O[3];
                        E = O[4];
                        diff0 += SAD(A, N1) + SAD(B, N2) +
```

```
            SAD (C, N3) + SAD(D, N4);
        SSAI(8):
        diff1 += SAD(SRC(B,A), N1) +
            SAD(SRC(C,B), N2) + SAD(SRC(D,C),
            N3) + SAD(SRC(E,D), N4):
        SSAI(16);
        diff2 += SAD(SRC(B,A), N1) +
            SAD(SRC(C,B), N2) + SAD(SRC(D,C),
            N3) + SAD(SRC(E,D), N4):
        SSAI(24);
        diff3 += SAD(SRC(B,A), N1) +
            SAD(SRC(C,B), N2) + SAD(SRC(D,C),
            N3) + SAD(SRC(E,D), N4);
        O += NY/4;
        N += NY/4;.
        }
        if (diff0 < best) {
            best = diff0;
            bestx = cx;
            besty = cy;
        }
        if (diff1 < best) {
            best = diff1;
            bestx = cx;
            besty = cy + 1;
        }
        if (diff2 < best) {
            best = diff2;
            bestx = cx;
            besty = cy + 2;
        }
        if (diff3 < best) {
            best = diff3;
            bestx = cx;
            besty = cy + 3;
        }
        }
    }
    VectX[bx][by] = bestx;
    VectY[bx][by] = besty;
    VectB[bx][by] = best;
    }
  }
}
```

This implementation uses the following SAD function to emulate the eventual new instruction:

```
/***********************************************************
    Sum of absolute difference of four bytes
***********************************************************/
static inline unsigned
SAD(unsigned ars, unsigned art)
{
    return ABSD(ars >> 24, art >> 24) +
        ABSD((ars >> 16) & 255, (art >> 16) & 255) +
        ABSD((ars >> 8) & 255, (art >> 8) & 255) +
        ABSD(ars & 255, art & 255);
}
```

To debug this new implementation, the following test program is used to compare the motion vectors and values computed by the new implementation and the base implementation:

```
/***********************************************************
    Main test
***********************************************************/
int
main(int argc, char **argv)
{
    int passwd;
```

```
#ifndef NOPRINTF
    printf("Block=(%d,%d), Search=(%d,%d), size=(%d,%d)\n",
        BLOCKX, BLOCKY, SEARCHX, SEARCHY, NX, NY);
#endif
    init ( );
    motion estimate base( );
    motion estimate tie( );
    passwd = check( );
#ifndef NOPRINTF
    printf(passwd ? "TIE version passed\n" : "** TIE version failed\n");
#endif
    return passwd;
}
```

This simple test program will be used throughout the development process. One important convention that must be followed here is that the main program must return 0 when an error is detected and 1 otherwise.

The use of TIE permits rapid specification of new instructions. The configfurable processor generator can fully implement these instructions in both the hardware implementation and the software development tools. Hardware synthesis creates an optimal integration of the new function into the hardware datapath. The configurable processor software environment fully supports the new instructions in the C and C++ compilers, the assembler, the symbolic debugger, the profiler and the cycle-accurate instruction set simulator. The rapid regeneration of hardware and software makes application-specific instructions a quick and reliable tool for application acceleration.

This example uses TIE to implement a simple instruction to perform pixel differencing, absolute value and accumulation on four pixels in parallel. This single instruction does eleven basic operations (which in a conventional process might require separate instructions) as an atomic operation. The following is the complete description:

```
// define a new opcode for Sum of Absolute Difference (SAD)
// from which instruction decoding logic is derived
opcode SAD opt=4'b0000 CUST0
// define a new instruction class
// from which compiler, assembler, disassembler
// routines are derived
iclass sad (SAD) (out arr, in ars, in art)
// semantic definition from which instruction-set
// simulation and RTL descriptions are derived
semantic sad-logic (SAD)
    wire [8:0] diff01, diff11, diff21, diff31;
    wire (7:0) diff0r, diff1r, diff2r, diff3r;
    assign diff01 = art[7:0] – ars[7:0];
    assign diff11 = art[15:8] – ars[15:8];
    assign diff21 = art[23:16] – ars[23:16];
    assign diff31 = art[31:24] – ars[31:24];
    assign diff0r = ars[7:0] – art[7:0];
    assign diff1r = ars[15:8] – art[15:8];
    assign diff2r = ars[23:16] – art[23:16];
    assign diff3r = ars[31:24] – art[31:24];
    assign arr =
        (diff01[8] ? diff0r : diff01) +
        (diff11[8] ? diff1r : diff11) +
        (diff21[8] ? diff2r : diff21) +
        (diff31[8] ? diff3r : diff31);
)
```

This description represents the minimum steps needed to define a new instruction. First, it is necessary to define a new opcode for the instruction. In this case, the new opcode SAD is defined as a sub-opcode of CUST0. As noted above, CUST0 is predefined as:

opcode QRST op0=4'b0000
opcode CUST0 op1=4'b0100        QRST

It is easy to see that QRST is the top-level opcode. CUST0 is a sub-opcode of QRST and SAD in turn a sub-opcode of CUST0. This hierarchical organization of opcodes allow logical grouping and management of the opcode spaces. One important thing to remember is that CUST0 (and CUST1) are defined as reserved opcode space for users to add new instructions. It is preferred that users stay within this allocated opcode space to ensure future re-usability of TIE descriptions.

The second step in this TIE description is to define a new instruction class containing the new instruction SAD. This is where the operands of SAD instruction is defined. In this case, SAD consists of three register operands, destination register arr and source registers ars and art. As noted previously, arr is defined as the register indexed by the r field of the instruction, ars and art are defined as registers indexed by the s and t fields of the instruction.

The last block in this description gives the formal semantic definitions for the SAD instruction. The description is using a subset of Verilog HDL language for describing combination logic. It is this block that defines precisely how the ISS will simulate the SAD instruction and how an additional circuitry is synthesized and added to the configurable processor hardware to support the new instruction.

Next, the TIE description is debugged and verified using the tools previously described. After verifying the correctness of the TIE description, the next step is to estimate the impact of the new instruction on the hardware size and performance. As noted above, this can be done using, e.g., Design Compiler™. When Design Compiler finishes, the user can look at the output for detailed area and speed reports.

After verifying that the TIE description is correct and efficient, it is time to configure and build a configurable processor that also supports the new SAD instruction. This is done using the GUI as described above.

Next, the motion estimation code is compiled into code for the configurable processor which uses the instruction set simulator to verify the correctness of the program and more importantly to measure the performance. This is done in three steps: run the test program using the simulator; run just the base implementation to get the instruction count; and run just the new implementation to get the instruction count The following is the simulation output of the second step:

| Block = (16, 16), Search = (4, 4), size = (32, 32) | | |
| --- | --- | --- |
| TIE version passed | | |
| Simulation Completed Successfully | | |
| Time for Simulation = 0.98 seconds | | |
| Events | Number | Number per 100 instrs |
| Instructions | 226005 | (100.00) |
| Unconditional taken branches | 454 | (0.20) |
| Conditional branches | 37149 | (16.44) |
| Taken | 26947 | (11.92) |
| Not taken | 10202 | (4.51) |
| Window Overflows | 20 | (0.01) |
| Window Underflows | 19 | (0.01) |

The following is the simulation output of the last step:

| Block = (16, 16), Search = (4, 4), size = (32, 32) | | |
| --- | --- | --- |
| TIE version passed | | |
| Simulation Completed Successfully | | |
| Time for Simulation = 0.36 seconds | | |
| Events | Number | Number per 100 instrs |
| Instructions | 51743 | (100.00) |
| Unconditional taken branches | 706 | (1.36) |
| Conditional branches | 3541 | (6.84) |
| Taken | 2759 | (5.33) |
| Not taken | 782 | (1.51) |
| Window Overflows | 20 | (0.04) |
| Window Underflows | 19 | (0.04) |

From the two reports one can see that roughly a 4× speedup has occurred. Notice that the configurable processor instruction set simulator can provide much other useful information.

After verifying the correctness and performance of the program, the next step is to run the test program using a Verilog simulator as described above. Those skilled in the art can glean the details of this process from the makefile of Appendix C (associated files also are shown in Appendix C). The purpose of this simulation is to further verify the correctness of the new implementation and more importantly to make this test program as part of the regression test for this configured processor.

Finally, the processor logic can be synthesized using, e.g., Design Compiler™ and placed and routed using, e.g., Apollo™.

This example has taken a simplified view of video compression and motion estimation for the sake of clarity and simplicity of explanation. In reality, there are many additional nuances in the standard compression algorithms. For example, MPEG 2 typically does motion estimation and compensation with sub-pixel resolution. Two adjacent rows or columns of pixels can be averaged to create a set of pixels interpolated to an imaginary position halfway between the two rows or columns. The configurable processor's user-defined instructions are again useful here, since a parallel pixel averaging instruction is easily implemented in just three or four lines of TIE code. Averaging between pixels in a row again uses the efficient alignment operations of the processor's standard instruction set.

Thus, the incorporation of a simple sum-of-absolute-differences instruction adds just a few hundred gates, yet improves motion estimation performance by more than a factor of ten. This acceleration represents significant improvements in cost and power efficiency of the final system. Moreover, the seamless extension of the software development tools to include the new motion estimation instruction allows for rapid prototyping, performance analysis and release of the complete software application solution. The solution of the present invention makes application-specific processor configuration simple, reliable and complete, and offers dramatic enhancement of the cost, performance, functionality and power-efficiency of the final system product.

As an example focusing on the addition of a functional hardware unit, consider the base configuration shown in FIG. 6 which includes the processor control function, program counter (PC), branch selection, instruction memory or cache and instruction decoder, and the basic integer datapath including the main register file, bypassing multiplexers, pipeline registers, ALU, address generator and data memory for the cache.

Figure 7:
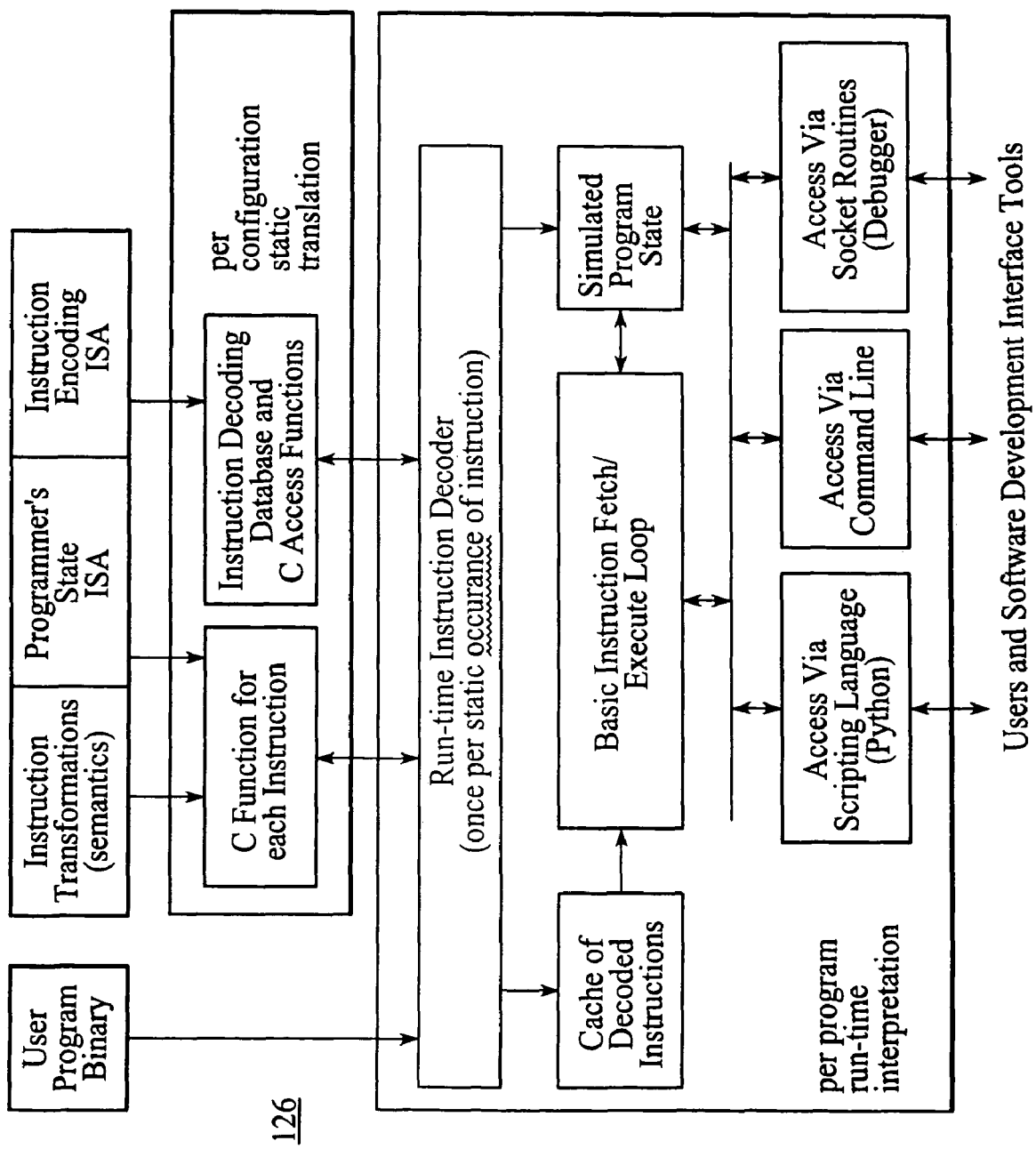
FIG. 7 is a block diagram of an instruction set simulator according to the preferred embodiment.

The HDL is written with the presence of the multiplier logic being conditional upon the "multiplier" parameter being set, and a multiplier unit is added as a new pipeline stage as shown in FIG. 7 (changes to exception handling may be required if precise exceptions are to be supported). Of course, instructions for making use of the multiplier are preferably added concomitantly with the new unit.

Figure 8:
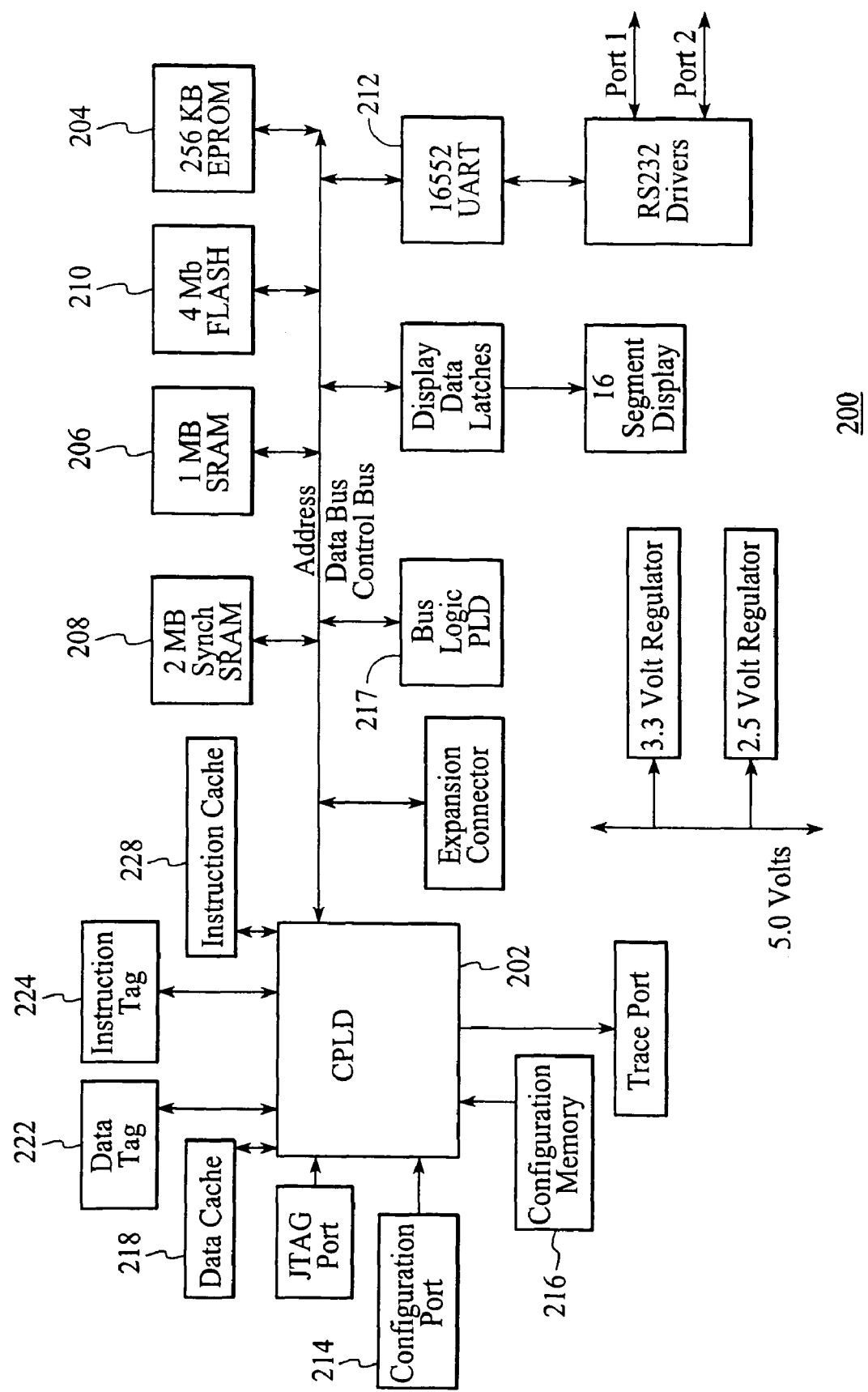
FIG. 8 is a block diagram of an emulation board for use with a processor configured according to the present invention.

As a second example, a full coprocessor may be added to the base configuration as shown in FIG. 8 for a digital signal processor such as a multiply/accumulate unit. This entails changes in processor control such as adding decoding control signals for multiply-accumulate operations, including decoding of register sources and destinations from extended instructions; adding appropriate pipeline delays for control signals; extending register destination logic; adding control for a register bypass multiplexer for moves from accumulate registers, and the inclusion of a multiply-accumulate unit as a possible source for an instruction result. Additionally, it requires addition of a multiply-accumulate unit which entails additional accumulator registers, a multiply-accumulate array and source select multiplexers for main register sources. Also, addition of the coprocessor entails extension of the register bypass multiplexer from the accumulate registers to take a source from the accumulate registers, and extension of the load/alignment multiplexer to take a source from the multiplier result. Again, the system preferably adds instructions for using the new functional unit along with the actual hardware.

Another option that is particularly useful in connection with digital signal processors is a floating point unit. Such a functional unit implementing, e.g., the IEEE 754 single-precision floating point operation standard may be added along with instructions for accessing it. The floating point unit may be used, e.g., in digital signal processing applications such as audio compression and decompression.

Figure 9:
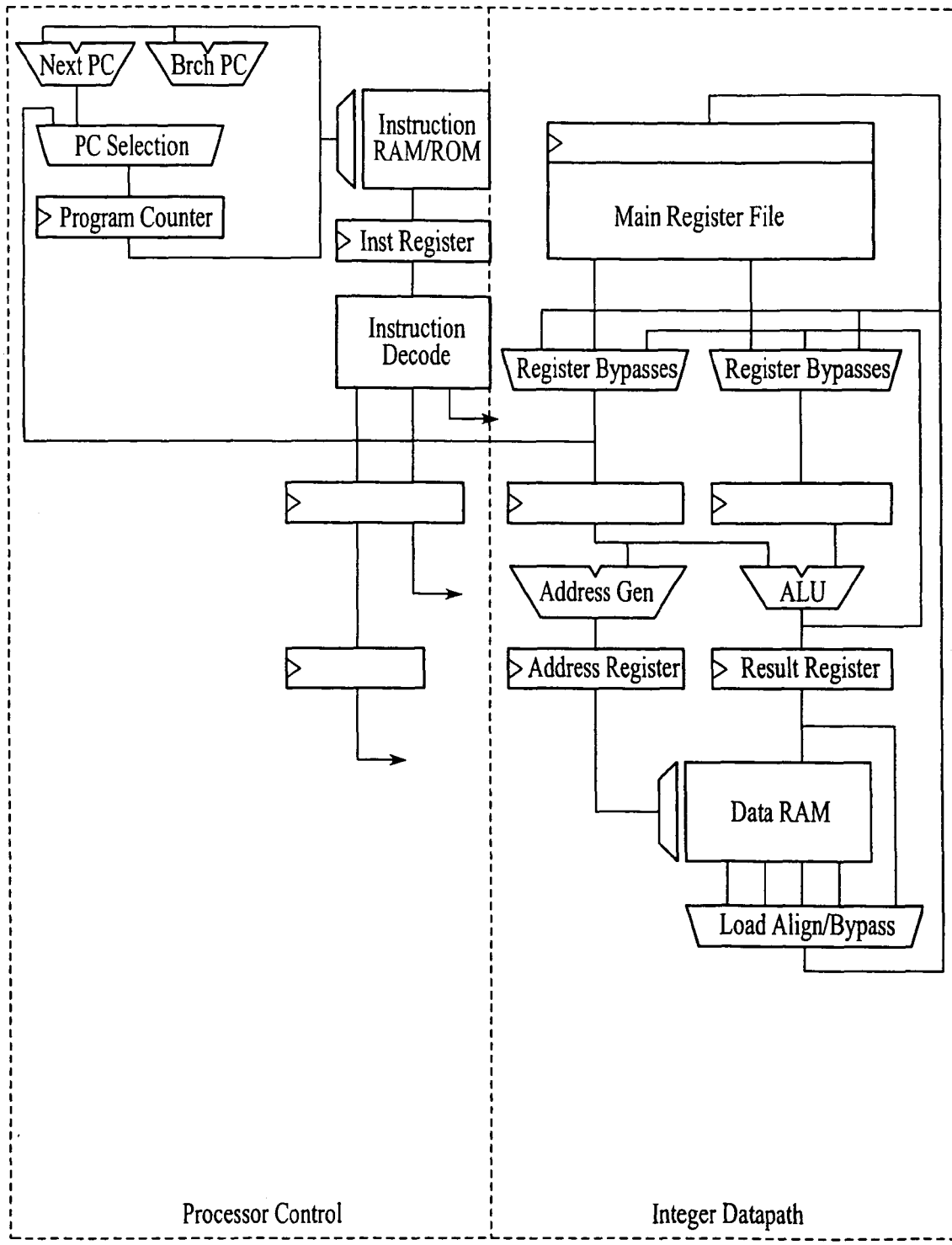
FIG. 9 is a block diagram showing the logical architecture of a configurable processor according to the preferred embodiment.
Figure 10:
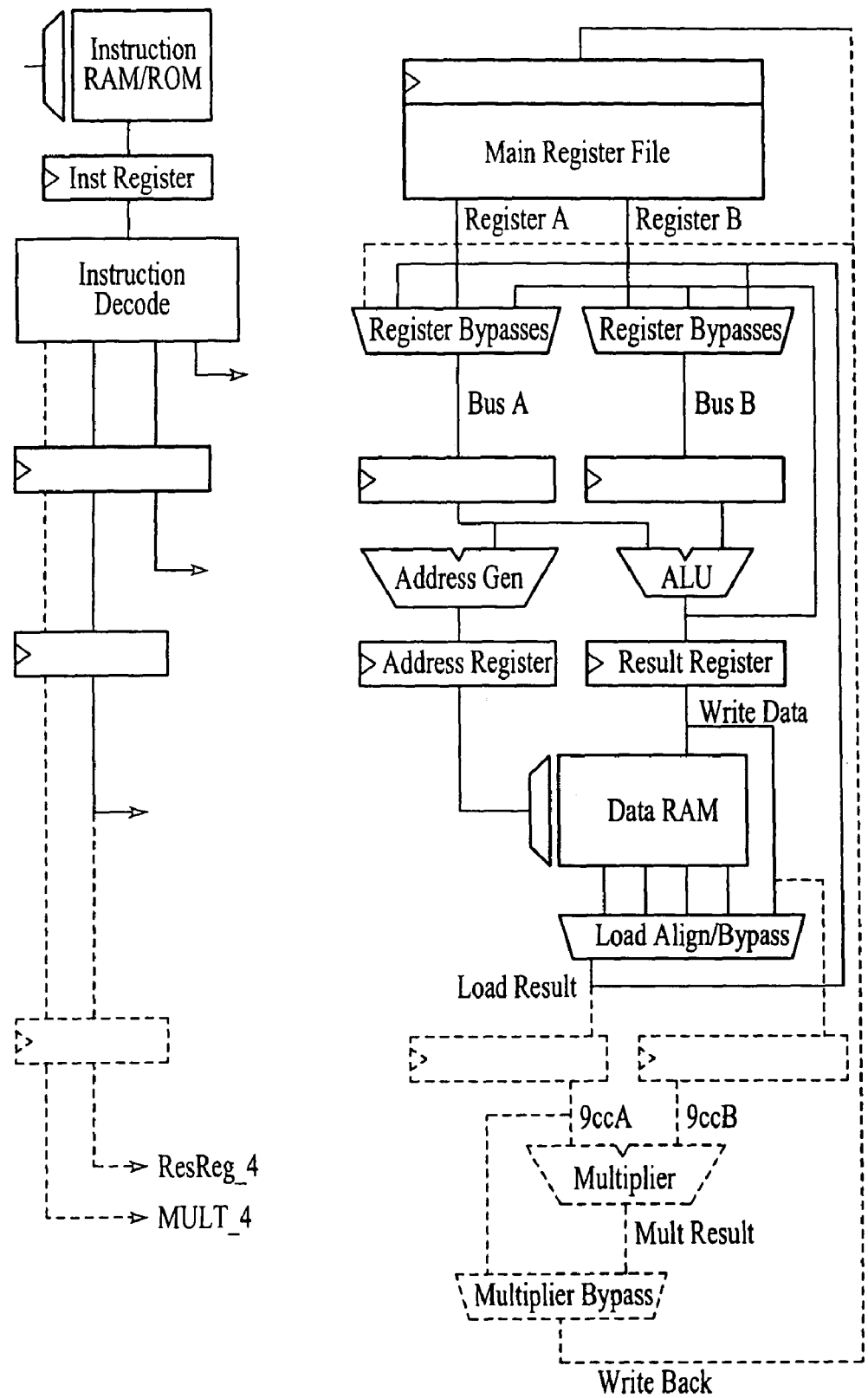
FIG. 10 is a block diagram showing the addition of a multiplier to the architecture of FIG. 9.

As yet another example of the system's flexibility, consider the 4 kB memory interface shown in FIG. 9. Using the configurability of the present invention, coprocessor registers and datapaths may be wider or narrower than the main integer register files and datapaths, and the local memory width may be varied so that the memory width is equal to the widest processor or coprocessor width (addressing of memory on reads and writes being adjusted accordingly). For example, FIG. 10 shows a local memory system for a processor that supports loads and stores of 32 bits to a processor/coprocessor combination addressing the same array, but where the coprocessor supports loads and stores of 128 bits. This can be implemented using the TPP code

```
function memory(Select,A1,A2,DI1,DI2,W1,W2,DO1,DO2)
; $B1 = config_get_value("width_of_port_1"); $B2 =
config_get_value("width_of_port 2");
; $Bytes = config_get_value("size_of_memory");
; $Max = max($B1,$B2); $Min = min($B1,$B2);
; $Banks = $Max/$Min;
; $Wide1 = ($Max == $B1); $Wide2 = ($Max == $B2);
; Depth = $Bytes/(log2($Banks)*log2($Max));
wire ['$Max'*8-1:0] Data1 = '$Wide1'?DI1:{'$Banks'{DI1}};
wire ['$Max'*8-1:0] Data2 = '$Wide1'?DI2:{'$Banks'{DI2}});
wire ['$Max'*8-1:0] D = Select ? Data1 : Data2;
wire Wide = Select ? Wide1: Wide2;
wire [log2('$Bytes')-1:0] A = Select? A1 : A2;
wire [log2('$Bytes')-1:0] Address = A[log2('$Bytes')-1:log2('$Banks')]:
wire [log2('$Banks')-1:0] Lane = A[log2('$Banks')-1:0]:
```

-continued

```
; for ($i=0; $i<$Banks; $i++) {
    wire WrEnable{i} = Wide | (Lane == {i});
    wire [log2('$Min')-1:0] WrData'$i' =
    D[({i}+1)*'$Min'*8-1:{i}*'$Min'*8]
    ram(RdData'$i',Depth,Address,WrData'$i',WrEnable'$i');
;}
wire ['$Max'*8-1:0] RdData = {
;for ($i=0; $i<$Banks; $i++) {
    RdData'$i',
;}
}
wire ['$B1'*8-1:0] DO1 =
Wide1?RdData:RdData[(Lane+1)*B1*8-1:Lane*B1*8];
wire ['$B2'*8-1:0] DO2 =
Wide2?RdData:RdData[(Lane+1)*B2*8-1:Lane*B2*8];
``` where $Bytes is the total memory size accessed either as width B1 bytes at byte address A1 with data bus D1 under control of write signal W1, or using corresponding parameters B2, A2, D2 and W2. Only one set of signals, defined by Select, is active in a given cycle. The TPP code implements the memory as a collection of memory banks. The width of each bank is given by the minimum access width and the number of banks by the ratio of the maximum and minimum access widths. A for loop is used to instantiate each memory bank and its associated write signals, i.e., write enable and write data. A second for loop is used to gather the data read from all the banks into a single bus.

Figure 11:
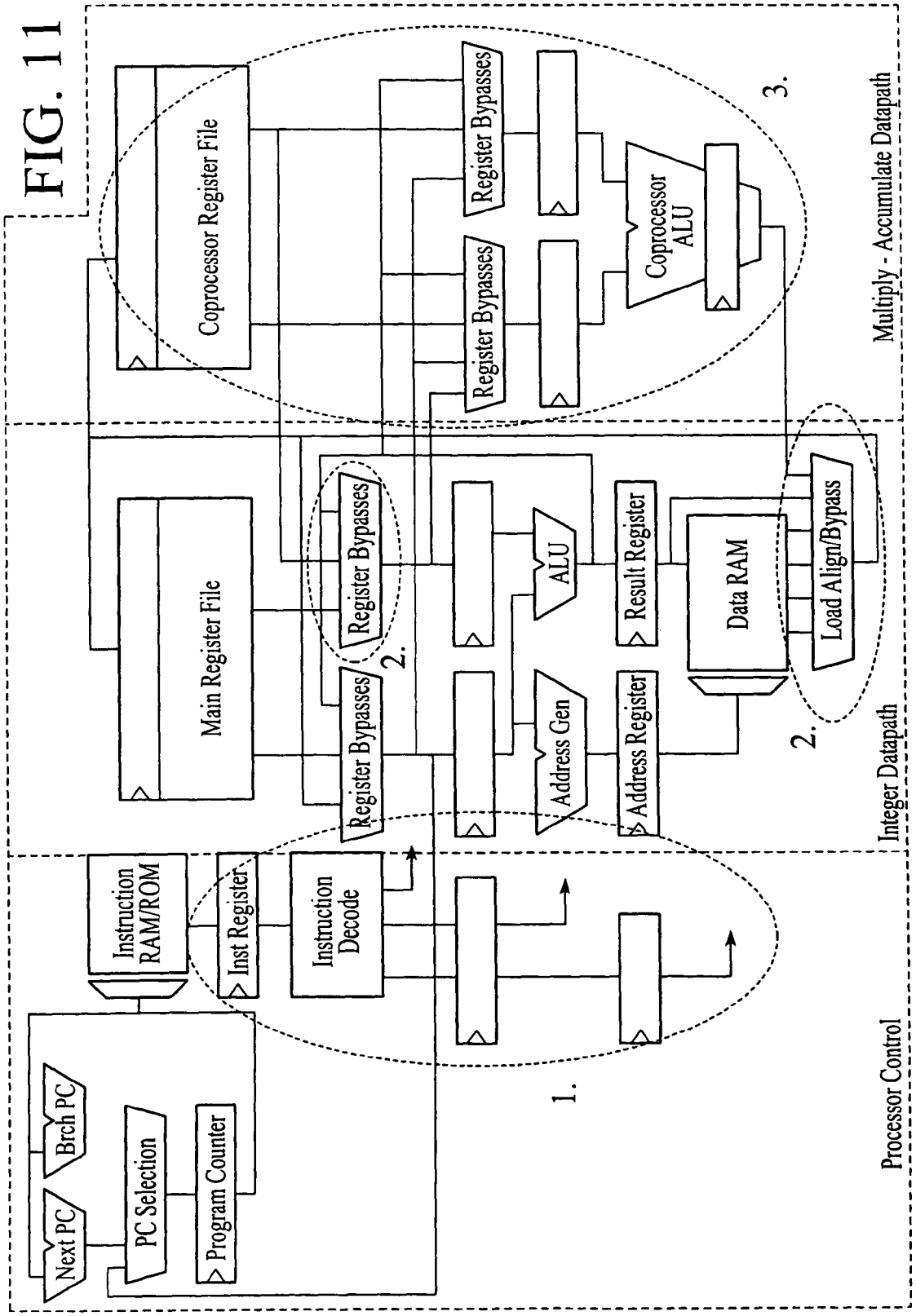
FIG. 11 is a block diagram showing the addition of a multiply-accumulate unit to the architecture of FIG. 9.

FIG. 11 shows an example of the inclusion of user-defined instructions in the base configuration. As shown in the Figure, simple instructions may be added to the processor pipeline with timing and interface similar to that of the ALU. Instructions added in this way must generate no stalls or exceptions, contain no state, use only the two normal source register values and the instruction word as inputs, and generate a single output value. If, however, the TIE language has provisions for specifying processor state, such constraints are not necessary.

Figure 12:
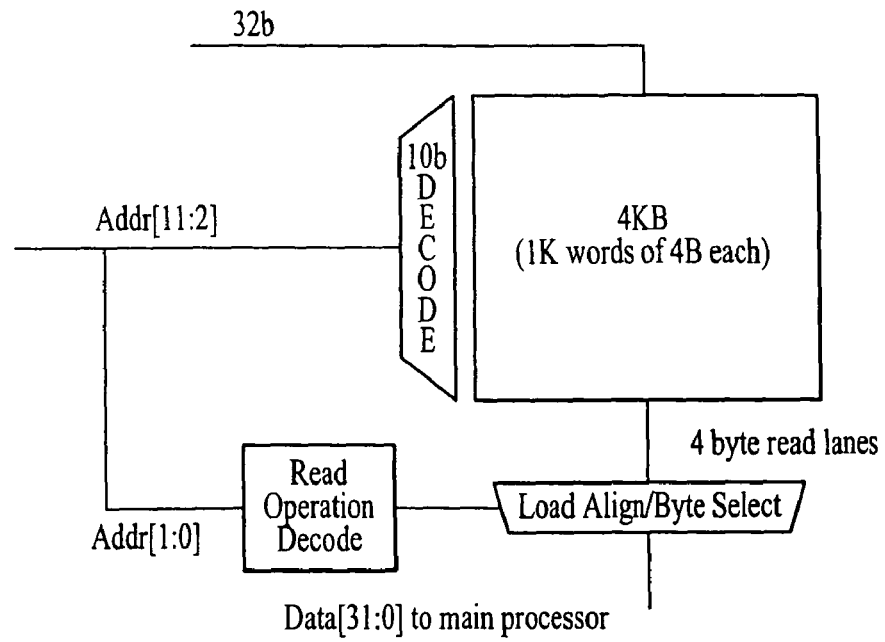
FIGS. 12 and 13 are diagrams showing the configuration of a memory in the preferred embodiment.

FIG. 12 shows another example of implementation of a user-defined unit under this system. The functional unit shown in the Figure, an 8/16 parallel data unit extension of the ALU, is generated from the following ISA code:

```
Instruction {
Opcode    ADD8_4      CUSTOM  op2=0000
Opcode    MIN16-2     CUSTOM  op2=0001
Opcode    SHIFT16_2   CUSTOM  op2=0002
iclass    MY          4ADD8,2MIN16,SHIFTI6_2    a<t,a<s,a>t
}
Implementation
input [31:0] art, ars;
input [23:0] inst;
input ADD8_4, MIN16 _2, SHIFTI6_2;
output [31:0] arr;
wire [31:0] add, min, shift;
assign add = (art[31:24] + ars[31:24], art[23:16] + art[23:16], art[15:8]
+ art[15:8], art[7:0] + art[7:0]);
assign min[31:16] = art[31:16] < ars[31:16] ? Art[31:16] : ars[31:16]:
assign min[15:0] = art[15:0] < ars[15:0] ? Art[15:0] : ars[15:0];
assign shift[31:16] = art[31:16] << ars[31:16];
assign shift[15:0] = art[15:0] << ars[15:0];
assign arr = {32{ADD8_4}} & add | {32(MIN16_2}} & min |
{32{SHIFTI6 2}} & shift; }
```

Modifications and variations of the preferred embodiment will be readily apparent to those skilled in the art. Such variations are within the scope of the present invention as defined by the appended claims.

What is claimed is:

1. A method of designing configurable processors comprising the steps of:
   selecting, through a graphical user interface of a computer system, processor functionality for a first processor, including selecting at least one extended processor instruction that provides additional processor functionality, wherein the processor functionality, including the at least one extended processor instruction, is selected from configuration options;
   inputting the selected processor functionality into the computer system, including the at least one of selected extended processor instruction that provides the additional processor functionality; and
   automatically building, using the computer system, based upon the selected processor functionality including the at least one extended processor instruction that provides the additional processor functionality, a first processor design, the first processor design including (1) a description of a hardware implementation of the first processor, and (2) software development tools specific to the hardware implementation.

2. The method according to claim 1, further including the step of:
   selecting, through the graphical user interface of the computer system, processor functionality for a second processor, including selecting at least one other extended processor instruction that provides other additional processor functionality different from the at least one extended processor instruction that provides the additional processor functionality and different from the functionality for the first processor, from the configuration options;
   inputting the selected processor functionality into the computer system, including the selected at least one other extended processor instruction that provides the other additional processor functionality; and
   building, using the computer system, based upon the selected processor functionality including the at least one other extended processor instruction that provides the other additional processor functionality, a second processor design that is different from the first processor design, the second processor design including (1) a second description of a second hardware implementation of the second processor, the second hardware implementation being different than the first hardware implementation, and (2) second software development tools specific to the second hardware implementation, the second software development tools being different than the first software development tools due at least in part to the at least one other extended processor instruction that provides the other additional processor functionality.

3. The method according to claim 2 further comprising the step of deleting one of the first and second processor designs using the graphical user interface of the computer system.

4. The method according to claim 2 further comprising the step of editing one of the first and second processor designs using the graphical user interface of the computer system.

5. The method of claim 1, wherein the software development tools include a compiler, tailored to the configuration specification, for compiling an application into code executable by the processor.

6. The method of claim 1, wherein the software development tools include an assembler, tailored to the configuration specification, for assembling an application into code executable by the processor.

7. The method of claim 1, wherein the software development tools include a linker, tailored to the configuration specification, for linking code executable by the processor.

8. The method of claim 1, wherein the software development tools include a disassembler, tailored to the configuration specification, for disassembling code executable by the processor.

9. The method of claim 1, wherein the software development tools include a debugger, tailored to the configuration specification, for debugging code executable by the processor.

10. The method of claim 9, wherein the debugger has a common interface and configuration for instruction set simulator and hardware implementations.

11. The method of claim 1, wherein the software development tools include an instruction set simulator, tailored to the configuration specification, for simulating code executable by the processor.

12. The method of claim 11, wherein the instruction set simulator is to model execution of code being simulated to measure key performance criteria including cycles of execution.

13. The method of claim 12, wherein the performance criteria are based on specific microarchitectural features selected through the graphical user interface.

14. The method of claim 10, wherein the instruction set simulator is to profile execution of the program being simulated to record standard profiling statistics, including a number of cycles executed in each simulated function.

15. The method of claim 1, wherein the selected processor functionality includes a data cache.

16. The method of claim 15, wherein the selected processor functionality specifies the size of the cache.

17. The method of claim 15, wherein the selected processor functionality specifies the line size of the cache.

18. The method of claim 15, wherein the selected processor functionality specifies the set associativity of the cache.

19. The method of claim 1, wherein the selecting step includes a binary selection of whether or not to include the selected processor functionality in the first processor.

* * * * *